(12) United States Patent
Kagaya et al.

(10) Patent No.: US 11,554,773 B2
(45) Date of Patent: Jan. 17, 2023

(54) POWER TRANSMISSION METHOD FOR VEHICLE AND POWER TRANSMISSION DEVICE FOR VEHICLE

(71) Applicant: NISSAN MOTOR CO., LTD., Yokohama (JP)

(72) Inventors: Takayuki Kagaya, Kanagawa (JP); Masato Koga, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/765,090

(22) PCT Filed: Oct. 1, 2019

(86) PCT No.: PCT/IB2019/001144
§ 371 (c)(1),
(2) Date: Mar. 30, 2022

(87) PCT Pub. No.: WO2021/064437
PCT Pub. Date: Apr. 8, 2021

(65) Prior Publication Data
US 2022/0355788 A1 Nov. 10, 2022

(51) Int. Cl.
*B60W 20/40* (2016.01)
*B60W 10/06* (2006.01)
(Continued)

(52) U.S. Cl.
CPC .............. *B60W 20/40* (2013.01); *B60K 6/40* (2013.01); *B60K 6/442* (2013.01); *B60W 10/02* (2013.01);
(Continued)

(58) Field of Classification Search
CPC ...... B60W 20/40; B60W 10/02; B60W 10/06; B60W 10/08; B60W 2510/0283;
(Continued)

(56) References Cited

U.S. PATENT DOCUMENTS

2001/0016536 A1* 8/2001 Minowa ................. B60K 6/48
180/65.23
2017/0291595 A1* 10/2017 Kim .......................... B60K 6/48
(Continued)

FOREIGN PATENT DOCUMENTS

| JP | 2008-222067 A | 9/2008 |
| JP | 2017-056836 A | 3/2017 |
| WO | WO 2019/111459 A1 | 6/2019 |

*Primary Examiner* — Roger L Pang
(74) *Attorney, Agent, or Firm* — Foley & Lardner LLP

(57) ABSTRACT

The method includes, based on a torque variation of a drive shaft after an engagement timing of an engine clutch 21 and before a release timing of a motor clutch 19 when switching a power transmission path from a first power transmission path 24 to a second power transmission path 25, increasing a slope of a torque increase of a power generation motor 4 in an absolute value with respect to a slope of a torque decrease of a traveling motor 2 in at least a part of a period from a timing T12 to a timing T14, and increasing a slope of a torque decrease of the power generation motor 4 in the absolute value with respect to a slope of a torque increase of the traveling motor 2 in at least a part of a period from the timing T14 to a timing T16.

6 Claims, 11 Drawing Sheets

(51) Int. Cl.
  *B60W 10/02* (2006.01)
  *B60W 10/08* (2006.01)
  *B60K 6/40* (2007.10)
  *B60K 6/442* (2007.10)
  *B60W 30/20* (2006.01)

(52) U.S. Cl.
  CPC ............ *B60W 10/06* (2013.01); *B60W 10/08* (2013.01); *B60W 2030/203* (2013.01); *B60W 2510/0241* (2013.01); *B60W 2510/0283* (2013.01); *B60W 2710/021* (2013.01); *B60W 2710/0672* (2013.01); *B60W 2710/085* (2013.01); *B60Y 2200/92* (2013.01)

(58) Field of Classification Search
  CPC ... B60W 2710/021; B60W 2710/0672; B60W 2710/085; B60W 2510/0241; B60W 2030/203; B60K 6/442
  USPC ............................................................ 477/5
  See application file for complete search history.

(56) References Cited

U.S. PATENT DOCUMENTS

2018/0186230 A1* 7/2018 Fukuda ................. B60W 10/06
2021/0188280 A1   6/2021 Abe et al.
2021/0213931 A1* 7/2021 Sasaki ...................... B60K 6/52
2022/0118966 A1* 4/2022 Kagaya ................. B60W 10/02

* cited by examiner

POWER TRANSMISSION METHOD FOR VEHICLE AND POWER TRANSMISSION DEVICE FOR VEHICLE

TECHNICAL FIELD

The present invention relates to power transmission for a vehicle.

BACKGROUND ART

JP2008-222067A discloses a technique that suppresses vibration that may act on a drive shaft by motor control when a clutch is coupled.

SUMMARY OF INVENTION

There are vehicles having the following configuration as vehicles that perform series HEV traveling, that is, series hybrid traveling, which uses a traveling motor as a power source, and engine traveling which uses an internal combustion engine as a power source.

That is, driving wheels are driven by power of the traveling motor via a first power transmission path or by power of the internal combustion engine via a second power transmission path. Further, an electric generator is driven by the power of the internal combustion engine. The traveling motor constitutes the power source arranged in the first power transmission path, and the internal combustion engine and the electric generator constitute the power sources arranged in the second power transmission path.

In such vehicles, the series HEV traveling and the engine traveling can be switched by switching the power transmission path, and the power source is different between the power transmission path before switching and the power transmission path after switching at the time of switching the power transmission path.

For this reason, in such vehicles, a clutch engagement can be performed after adjusting a rotation speed by the power source arranged in the power transmission path after switching. From this, a meshing clutch mechanism that is advantageous in terms of cost and the like is disposed in each of the first power transmission path and the second power transmission path.

At the time of switching the power transmission path, of the first power transmission path and the second power transmission path, the power transmission path before switching becomes a side where a torque is decreased and the power transmission path after switching becomes a side where the torque is increased to perform shifting of the torque. At this time, first, the clutch engagement is performed in the power transmission path after switching.

When the meshing clutch mechanism is engaged, some differential rotation is required between engaging members to be mutually engaged so that a meshing is not blocked by a deviation in a rotation direction. In view of this, when the meshing clutch mechanism is engaged, vibration occurs at a drive shaft due to such a differential rotation in some cases.

The vibration of the drive shaft can be suppressed by increasing and decreasing the torque of the power sources that can transmit the torque to the drive shaft. In view of this, in order to suppress the vibration of the drive shaft, for example, it is conceivable to decrease the torque of the power source on the side where the torque is increased. However, in this case, an increase of the torque is delayed, and a time period until the torque that should be increased reaches a torque after completion of the shifting, that is, a time period until the shifting of the torque is completed becomes long.

Further, in order to suppress the vibration of the drive shaft, it is also conceivable to increase the torque of the power source on the side where the torque is decreased. However, in this case, a decrease of the torque is delayed, and a time period until the torque that should be decreased reaches a torque after completion of the shifting, that is, a time period until the shifting of the torque is completed becomes long.

That is, in these cases, the time period required for switching the power transmission path becomes long.

The present invention has been made in consideration of such a problem, and an object of which is to switch a power transmission path without delay while suppressing vibration of a drive shaft.

A power transmission method for a vehicle according to one aspect of the present invention is used in a vehicle including an electric generator configured to be driven by a power of an internal combustion engine, a traveling motor configured to drive a driving wheel by an electric power generated by the electric generator, a first power transmission path configured to transmit a power between the traveling motor and the driving wheel, a first meshing clutch mechanism configured to connect or disconnect a power transmission of the first power transmission path, a second power transmission path configured to mechanically transmit the power of the internal combustion engine to the driving wheel, and a second meshing clutch mechanism configured to connect or disconnect a power transmission of the second power transmission path. In the vehicle, the driving wheel is driven by the power of the internal combustion engine or a power of the traveling motor in the vehicle, and the traveling motor arranged in the first power transmission path, and the internal combustion engine and the electric generator arranged in the second power transmission path constitute power sources. The power transmission method for a vehicle includes, on the basis of a torque variation of a drive shaft after an engagement timing of a meshing clutch mechanism after a switching and before a release timing of a meshing clutch mechanism before the switching when a power transmission path is switched from one of the first power transmission path and the second power transmission path to the other, in which the meshing clutch mechanism after the switching is a meshing clutch mechanism arranged in a power transmission path after the switching between the first meshing clutch mechanism and the second meshing clutch mechanism and the meshing clutch mechanism before the switching is a meshing clutch mechanism arranged in a power transmission path before the switching, performing at least one of: increasing a slope of a torque increase of a power source after the switching in an absolute value with respect to a slope of a torque decrease of a power source before the switching in at least a part of a period when the drive shaft vibrates in association with an engagement of the meshing clutch mechanism after the switching while a torque transmitted by the drive shaft is smaller than a torque at a start of the switching of the power transmission path, in which the power source after the switching is a power source arranged in the power transmission path after the switching among the power sources and the power source before the switching is a power source arranged in the power transmission path before the switching; and increasing a slope of a torque decrease of the power source before the switching in the absolute value with respect to a slope of a torque increase of the power source after switching in at least a part of a period when the drive shaft vibrates in association with the engagement of the meshing clutch mechanism after the switching while the torque transmitted by the drive shaft is larger than the torque at the start of the switching of the power transmission path.

According to another aspect of the present invention, a power transmission device for a vehicle corresponding to the above-mentioned power transmission method for the vehicle is provided.

DESCRIPTION OF EMBODIMENTS

The following describes an embodiment of the present invention with reference to the accompanying drawings.

Figure 1:
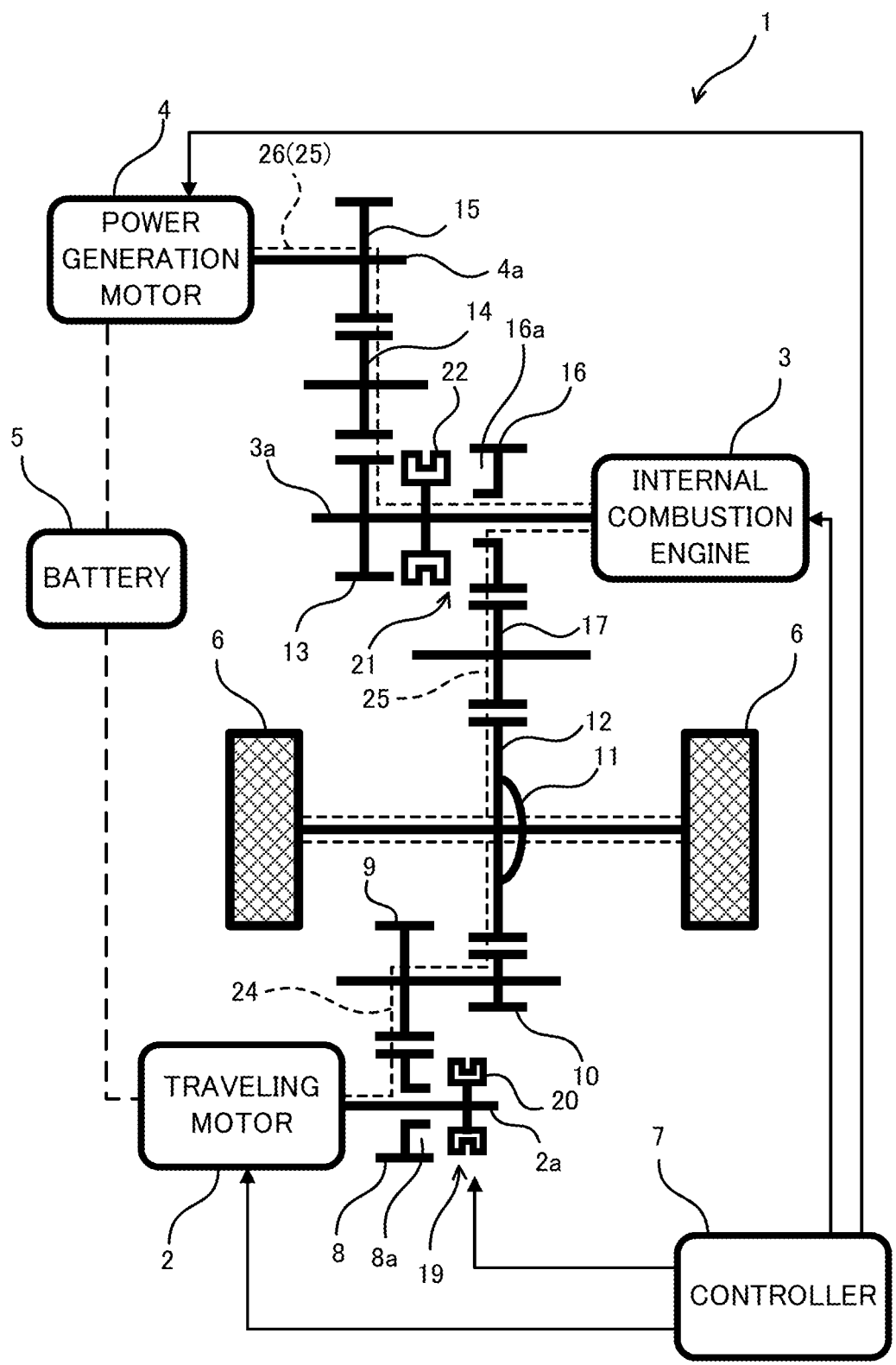
FIG. 1 is a schematic configuration diagram of a power transmission device for a vehicle.

FIG. 1 is a schematic configuration diagram of a power transmission device for a vehicle according to the embodiment. A vehicle 1 includes an internal combustion engine 3, a power generation motor 4, a battery 5, a traveling motor 2, and a controller 7.

The internal combustion engine 3 may be either a gasoline engine or a diesel engine. The internal combustion engine 3 constitutes a power source in the vehicle 1.

The power generation motor 4 generates electricity by being driven by power of the internal combustion engine 3. The power generation motor 4 has also a function to motor the internal combustion engine 3 by power running by electric power of the battery 5 described later. The power generation motor 4 constitutes an electric generator and in addition, constitutes a power source in the vehicle 1.

To the battery 5, the electric power generated by the power generation motor 4 and electric power regenerated by the traveling motor 2 described later are charged.

The traveling motor 2 is driven by the electric power in the battery 5 to drive driving wheels 6. Further, the traveling motor 2 also has what is called a regeneration function in which deceleration energy is regenerated as the electric power by being rotated together in association with rotation of the driving wheels 6 during deceleration and the like. The traveling motor 2 constitutes a power source in the vehicle 1.

The controller 7 performs controls of the traveling motor 2, the internal combustion engine 3, and the power generation motor 4. The controller 7 is composed of a microcomputer including a central processing unit (CPU), a read-only memory (ROM), a random access memory (RAM), and an input/output interface (I/O interface). The controller 7 can be composed of a plurality of microcomputers. To the controller 7, signals from various sensors, switches and the like are input. The various sensors, switches and the like include a vehicle speed sensor for detecting a vehicle speed VSP, an accelerator position (accelerator opening degree) sensor for detecting an accelerator position APO, a clutch sensor for detecting an actuation state of a motor clutch 19 and an engine clutch 21 that are described later, a rotation speed sensor for detecting an input and output rotation speed of the motor clutch 19 and the engine clutch 21, and the like.

The vehicle 1 has a first power transmission path 24, a second power transmission path 25, and a third power transmission path 26. The first power transmission path 24 transmits the power between the traveling motor 2 and the driving wheels 6. The second power transmission path 25 transmits the power between the internal combustion engine 3 and the driving wheels 6 by mechanically transmitting the power of the internal combustion engine 3 to the driving wheels 6. The third power transmission path 26 transmits the power between the internal combustion engine 3 and the power generation motor 4.

The first power transmission path 24 is composed of a first speed reducing gear 8, a second speed reducing gear 9, a differential gear 12, and a third speed reducing gear 10. The first speed reducing gear 8 is disposed on a rotation shaft 2a of the traveling motor 2. The second speed reducing gear 9 meshes with the first speed reducing gear 8. The differential gear 12 is disposed in a differential case 11. The third speed reducing gear 10 is disposed coaxially with the second speed reducing gear 9 and meshes with the differential gear 12. The motor clutch 19 that is a first meshing clutch mechanism is disposed on the first power transmission path 24.

The motor clutch 19 switches a state of the first speed reducing gear 8 between a state of being relatively rotatable with respect to the rotation shaft 2a and a state of being not relatively rotatable. The motor clutch 19 is what is called a dog clutch composed of a first sleeve 20 slidably supported in an axial direction on the rotation shaft 2a and a coupling portion 8a disposed in the first speed reducing gear 8.

That is, the first sleeve 20 moves to a direction of the first speed reducing gear 8, and a plurality of projecting portions disposed in the first sleeve 20 and a plurality of projecting portions disposed in the coupling portion 8a are alternately arranged in the rotation direction and meshed, thereby causing the motor clutch 19 to become in an engagement state. Further, from this state, the first sleeve 20 moves to an opposite direction to the first speed reducing gear 8, and the meshing of both projecting portions is released, thereby causing the motor clutch 19 to become in a release state. The movement of the first sleeve 20 is performed by an electric actuator, and the engagement and release operation of the motor clutch 19 is controlled by the controller 7.

As long as the motor clutch 19 is in the engagement state, the power of the traveling motor 2 is transmitted to the driving wheels 6. On the other hand, as long as the motor clutch 19 is in the release state, rotation of the rotation shaft 2a of the traveling motor 2 is not transmitted to the first speed reducing gear 8. Therefore, power transmission from the traveling motor 2 to the driving wheels 6 is cut off. In the first power transmission path 24, the traveling motor 2 constitutes the power source positioned upstream of the motor clutch 19.

The second power transmission path 25 is composed of a fourth speed reducing gear 16, a fifth speed reducing gear 17, and the differential gear 12. The fourth speed reducing gear 16 is disposed on an output shaft 3a of the internal combustion engine 3. The fifth speed reducing gear 17 meshes with the fourth speed reducing gear 16. The differential gear 12 meshes with the fifth speed reducing gear 17. The engine clutch 21 that is a second meshing clutch mechanism is disposed on the second power transmission path 25.

The engine clutch 21 switches a state of the fourth speed reducing gear 16 between a state of being relatively rotatable with respect to the output shaft 3a and a state of being not relatively rotatable. The engine clutch 21 is what is called a dog clutch composed of a second sleeve 22 slidably supported in an axial direction on the output shaft 3a and a coupling portion 16a disposed in the fourth speed reducing gear 16.

That is, the second sleeve 22 moves to a direction of the fourth speed reducing gear 16, and a plurality of projecting portions disposed in the second sleeve 22 and a plurality of projecting portions disposed in the coupling portion 16a are alternately arranged in the rotation direction and meshed, thereby causing the engine clutch 21 to become in an engagement state. Further, from this state, the second sleeve 22 moves to an opposite direction to the fourth speed reducing gear 16 and the meshing of both projecting portions is released, thereby causing the engine clutch 21 to become in a release state. The movement of the second sleeve 22 is performed by an electric actuator, and the engagement and release operation of the engine clutch 21 is controlled by the controller 7.

As long as the engine clutch 21 is in the engagement state, the power of the internal combustion engine 3 is transmitted to the driving wheels 6. In the following description, this state is also referred to as an engine direct connection state. On the other hand, as long as the engine clutch 21 is in the release state, rotation of the output shaft 3a of the internal combustion engine 3 is not transmitted to the fourth speed reducing gear 16. Therefore, the power transmission from the internal combustion engine 3 to the driving wheels 6 is cut off.

The third power transmission path 26 is composed of a sixth speed reducing gear 13, a seventh speed reducing gear 14, and an eighth speed reducing gear 15. The sixth speed reducing gear 13 is disposed on the output shaft 3a of the internal combustion engine 3. The seventh speed reducing gear 14 meshes with the sixth speed reducing gear 13. The eighth speed reducing gear 15 is disposed on a rotation shaft 4a of the power generation motor 4 and meshes with the seventh speed reducing gear 14. The third power transmission path 26 does not include a component that cuts off the power transmission. That is, the third power transmission path 26 is in a state where the power is constantly transmitted.

The second power transmission path 25 is configured to further include the third power transmission path 26. Accordingly, the second power transmission path 25 is a path where the power of the internal combustion engine 3 is further transmitted to the power generation motor 4. In the second power transmission path 25 such as this, the internal combustion engine 3 and the power generation motor 4 constitute the power sources positioned upstream of the engine clutch 21.

The vehicle 1 having the above-described configuration can switch between a series HEV mode and an engine direct connection mode. In the series HEV mode, the vehicle 1 travels by transmitting the power to the driving wheels 6 by the first power transmission path 24. In the engine direct connection mode, the vehicle 1 travels by coming into the engine direct connection state and transmitting the power to the driving wheels 6 by the second power transmission path 25. The controller 7 switches between the series HEV mode and the engine direct connection mode depending on an engine operating state, specifically the vehicle speed VSP and a driving force.

Figure 2:
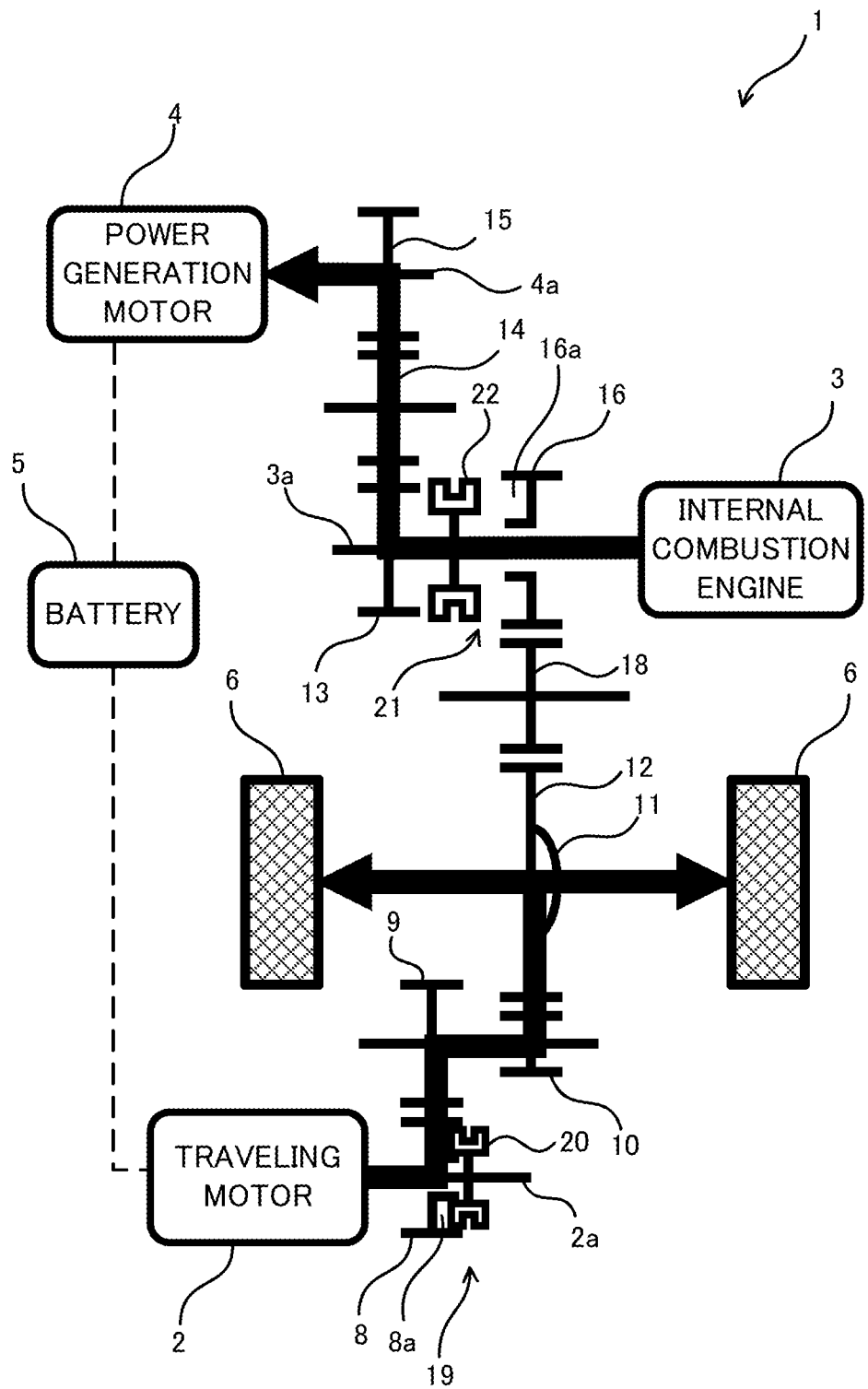
FIG. 2 is a diagram illustrating a power transmission state in a series hybrid mode.

FIG. 2 is a diagram illustrating a power transmission state in the series HEV mode. In the series HEV mode, the power is transmitted to the driving wheels 6 by the first power transmission path 24. That is, in the series HEV mode, the motor clutch 19 becomes in the engagement state, thereby transmitting the power generated by the traveling motor 2 to the driving wheels 6. At this time, the engine clutch 21 becomes in the release state.

Further, also in the series HEV mode, the power of the internal combustion engine 3 is transmitted to the power generation motor 4 via the third power transmission path 26, the power generation motor 4 generates electricity, and the generated electric power is charged to the battery 5. However, whether or not the power generation motor 4 generates electricity is determined depending on a charge amount of the battery 5. When it is not necessary to charge to the battery 5, the internal combustion engine 3 stops.

Figure 3:
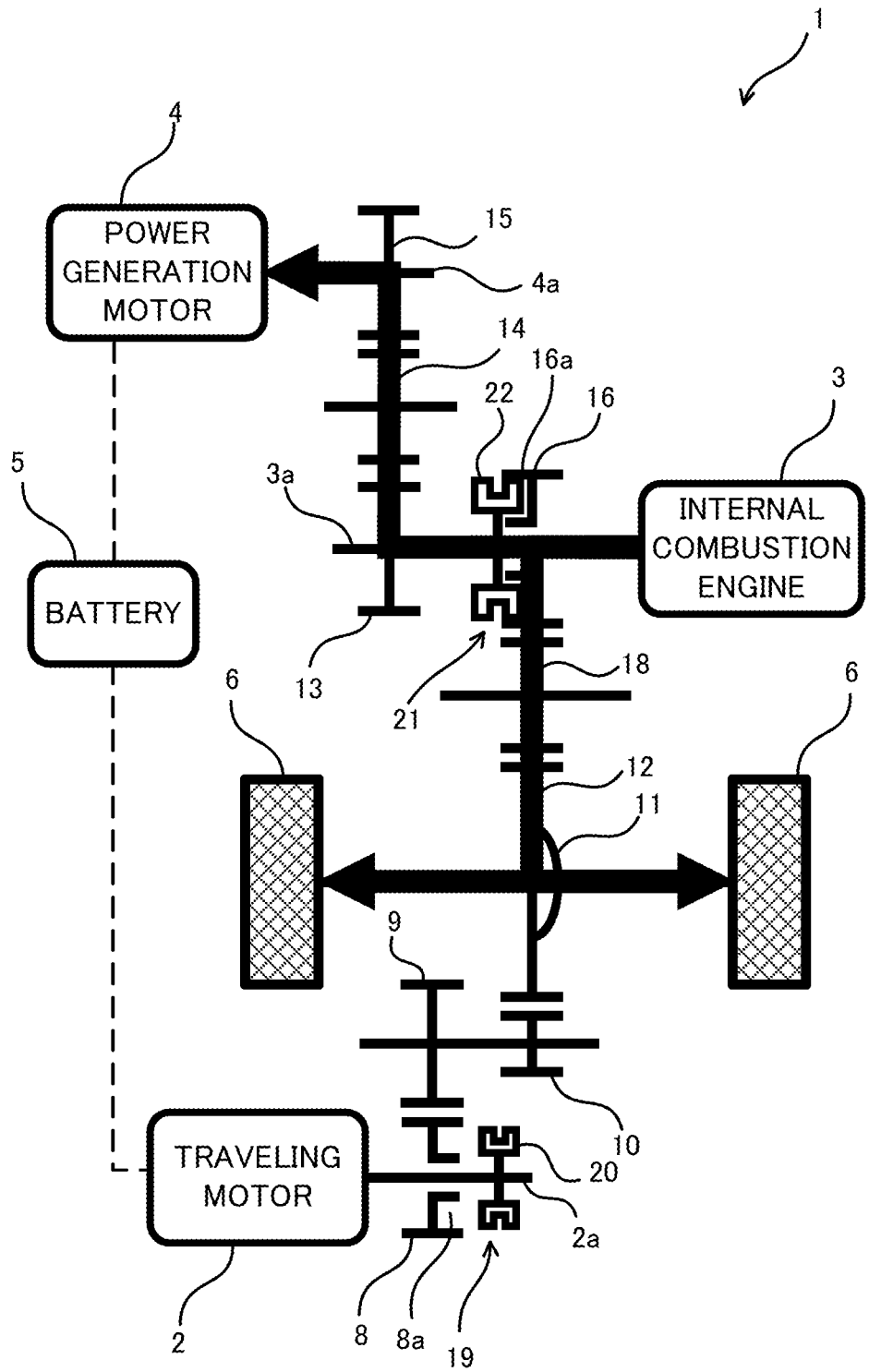
FIG. 3 is a diagram illustrating a power transmission state in an internal combustion engine direct connection mode.

FIG. 3 is a diagram illustrating a power transmission state in the engine direct connection mode. In the engine direct connection mode, the power is transmitted to the driving wheels 6 by the second power transmission path 25. That is, in the internal combustion engine direct connection mode, the engine clutch 21 becomes in the engagement state, thereby transmitting the power generated by the internal combustion engine 3 to the driving wheels 6.

In the engine direct connection mode, the motor clutch 19 becomes in the release state. Provisionally, when the motor clutch 19 is brought into the engagement state in the engine direct connection mode, the traveling motor 2 is rotated together in association with the rotation of the driving wheels 6 and an induced electromotive force is generated. When there is a margin in a charging capacity of the battery 5, the generated electric power is charged to the battery 5 to regenerate the energy. However, when there is not a margin in the charging capacity of the battery 5, resistance to the electric generation becomes friction that blocks the rotation of the driving wheels 6 and becomes a cause of a decrease in fuel economy performance. In contrast to this, in this embodiment, since the motor clutch 19 becomes in the release state in the engine direct connection mode, the decrease in the fuel economy performance due to the traveling motor 2 being rotated together as described above can be suppressed.

When a traveling mode is switched between the series HEV mode and the engine direct connection mode, the power transmission path is switched between the first power transmission path 24 and the second power transmission path 25. Then, at the time of switching the power transmission path, the power source differs between the power transmission path before switching and the power transmission path after switching.

For this reason, in the vehicle 1, clutch engagement can be performed after adjusting the rotation speed by the power source arranged in a power transmission mechanism after switching. From this, in the vehicle 1, the motor clutch 19 and the engine clutch 21 that are the meshing clutch mechanisms advantageous in terms of cost and the like are used in the first power transmission path 24 and the second power transmission path 25.

At the time of switching the power transmission path, of the first power transmission path 24 and the second power transmission path 25, the power transmission path before switching becomes the side where torque is decreased and the power transmission path after switching becomes the side where the torque is increased to perform shifting of the torque. At this time, first, the clutch engagement is performed in the power transmission path after switching.

For example, when the traveling mode is switched from the series HEV mode to the engine direct connection mode, that is, when the power transmission path is switched from the first power transmission path 24 to the second power transmission path 25, the engagement of the engine clutch 21 disposed in the second power transmission path 25 is first performed.

When the engine clutch 21 is engaged, some differential rotation $\Delta NR$ is required between the second sleeve 22 and the fourth speed reducing gear 16 that are engaging members to be mutually engaged so that the meshing is not blocked by a deviation in the rotation direction. In view of this, when the engine clutch 21 is engaged, vibration is generated at a drive shaft due to the differential rotation $\Delta NR$ in some cases.

The vibration of the drive shaft can be suppressed by increasing and decreasing the torque of the power sources capable of transmitting the torque to the drive shaft. In view of this, in order to suppress the vibration of the drive shaft, for example, it is conceivable to decrease the torque of the power source on the side where the torque is increased, that is to say, the torque of the power generation motor 4 when the power transmission path is switched from the first power transmission path 24 to the second power transmission path 25. However, in this case, an increase in the torque is delayed, and a time period until the torque that should be increased reaches the torque after completion of the shifting, that is, a time period until the shifting of the torque is completed becomes long.

Further, in order to suppress the vibration of the drive shaft, it is also conceivable to increase the torque of the power source on the side where the torque is decreased, that is to say, the torque of the traveling motor 2 when the power transmission path is switched from the first power transmission path 24 to the second power transmission path 25. However, in this case, a decrease in the torque is delayed, and a time period until the torque that should be decreased reaches the torque after completion of the shifting, that is, a time period until the shifting of the torque is completed becomes long.

That is, in these cases, the time period required for switching the power transmission path becomes long. This also applies to a case where the power transmission path is switched from the second power transmission path 25 to the first power transmission path 24.

In consideration of such circumstances, in this embodiment, the controller 7 performs controls as described in the following.

Figure 4:
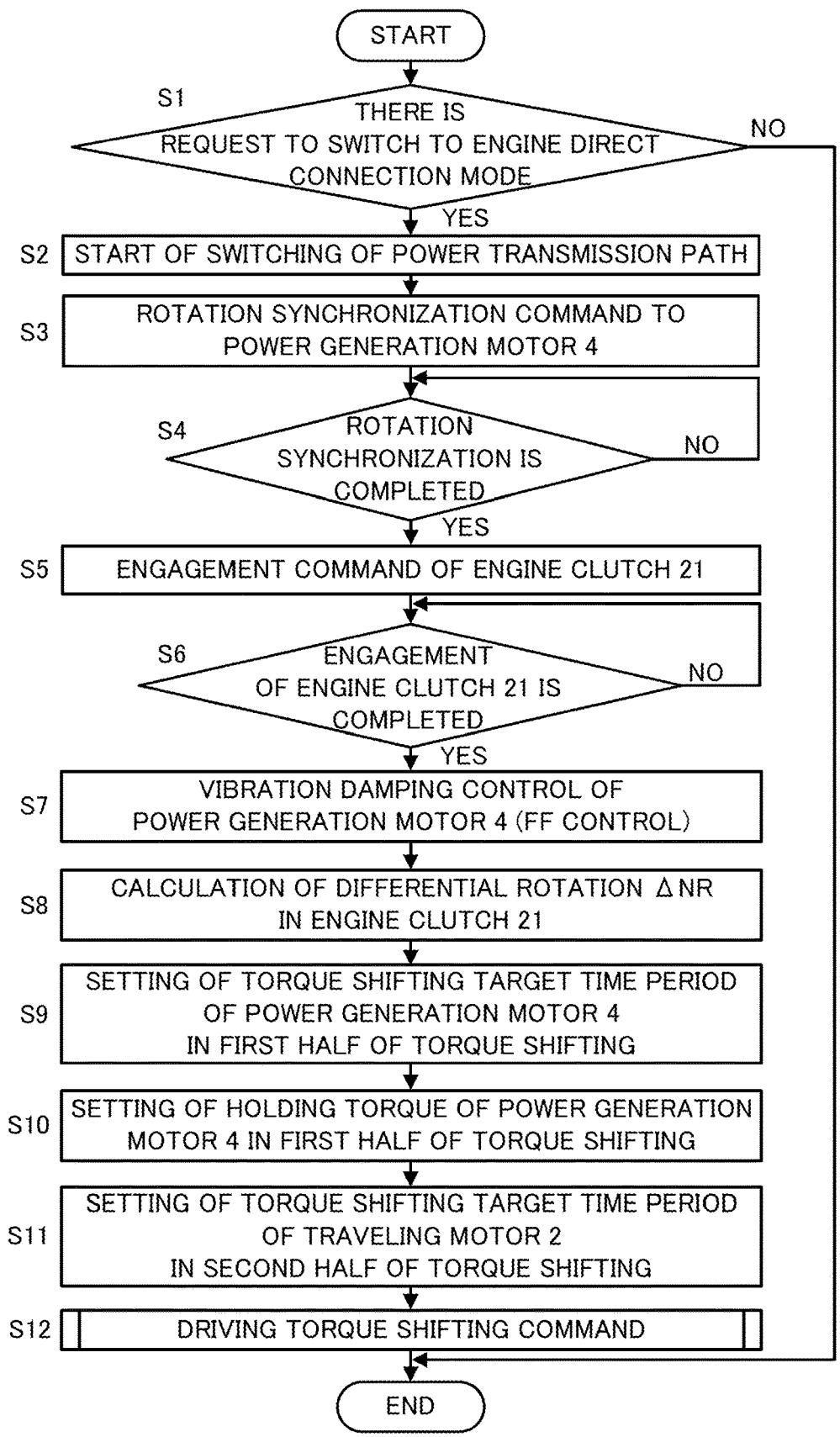
FIG. 4 is a view illustrating a flowchart of a first example of a control of an embodiment.
Figure 5:
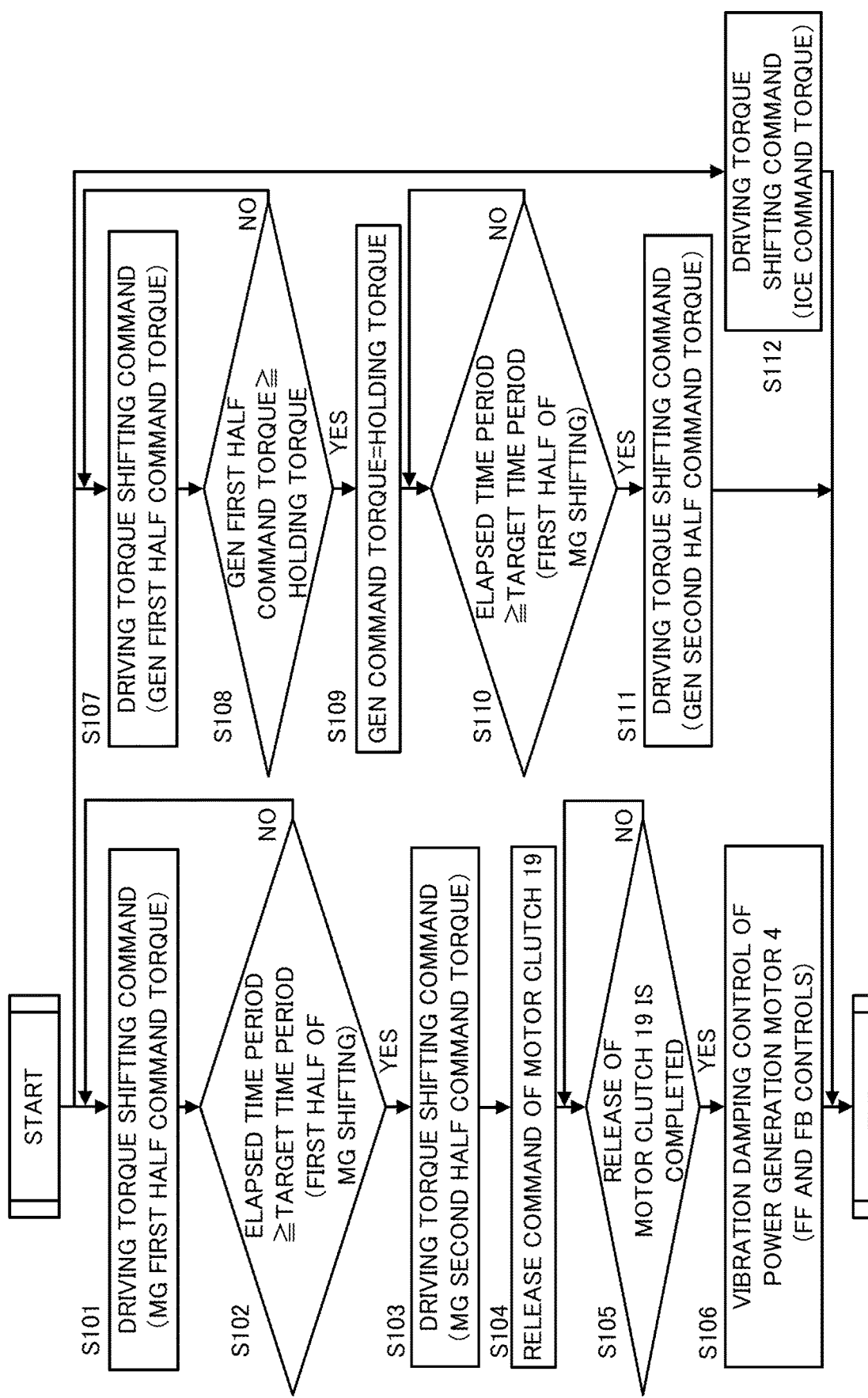
FIG. 5 is a view illustrating a part of processing of the first example by a subroutine.

FIG. 4 and FIG. 5 are views illustrating flowcharts of a first example of a control that the controller 7 performs. The controller 7 is programmed to perform processing illustrated in these flowcharts and is configured to have a control unit by performing the processing illustrated in these flowcharts.

In a step S1, the controller 7 determines whether or not there is a request to switch to the engine direct connection mode. In the step S1, it is determined whether or not there is the request to switch the traveling mode from the series HEV mode to the engine direct connection mode on the basis of a switching map of the traveling mode. When a negative determination is made in the step S1, the processing ends once. When a positive determination is made in the step S1, the processing proceeds to a step S2.

In the step S2, the controller 7 starts switching the power transmission path. In this example, switching of the power transmission path from the first power transmission path 24 to the second power transmission path 25 starts.

In a step S3, the controller 7 performs a rotation synchronization command to the power generation motor 4. This causes the rotation synchronization of the engine clutch 21 to be ensured with the power generation motor 4 arranged in the second power transmission path 25 after switching as the power source.

In a step S4, the controller 7 determines whether or not the rotation synchronization is completed. The rotation synchronization is determined to be completed when a magnitude of the differential rotation $\Delta NR$ becomes less than a predetermined value $\Delta NR1$. The differential rotation $\Delta NR$ is a rotation speed difference between an input rotation speed and an output rotation speed of the meshing clutch mechanism arranged in the power transmission path after switching, that is to say, a rotation speed difference between an input rotation speed and an output rotation speed of the engine clutch 21 in this example.

The predetermined value $\Delta NR1$ can be preset so that the appropriate differential rotation $\Delta NR$ remains in the meshing clutch mechanism when the engagement is performed. The predetermined value $\Delta NR1$ may be a value identical to a rotation synchronization determination described later which is performed when the traveling mode is switched from the engine direct connection mode to the series HEV mode or may be a different value. When a negative determination is made in the step S4, the processing returns to the step S4. When a positive determination is made in the step S4, the processing proceeds to a step S5.

In the step S5, the controller 7 performs an engagement command of the engine clutch 21. This starts the engagement of the engine clutch 21.

In a step S6, the controller 7 determines whether or not the engagement of the engine clutch 21 is completed. In the step S6, it is determined whether or not the engagement of the engine clutch 21 is completed on the basis of the clutch sensor. That is, the clutch sensor is used to determine a time point at which the engagement of the engine clutch 21 is completed. When a negative determination is made in the step S6, the processing returns to the step S6. When a positive determination is made in the step S6, the processing proceeds to a step S7.

In the step S7, the controller 7 performs a vibration damping control of the power generation motor 4. In the step S7, the vibration damping control of the power generation motor 4 is performed by an FF control, that is, a feedforward control, and not performed together with by an FB control, that is, a feedback control.

In a step S8, the controller 7 calculates the differential rotation $\Delta NR$ in the engine clutch 21. The differential rotation $\Delta NR$ is a differential rotation $\Delta NR$ immediately before the engine clutch 21 is engaged. Immediately before the engine clutch 21 is engaged means immediately before the time point at which the completion of the engagement is determined on the basis of the clutch sensor (for example, in a control cycle at which the completion of the engagement of the engine clutch 21 is determined, a control cycle one cycle before the control cycle at which the completion of the engagement is determined). Immediately before the engine clutch 21 is engaged may be immediately before an engagement operation is instructed to an actuator that actuates the engine clutch 21, and in this case, the control cycle can be a control cycle about the instruction to the actuator.

In a step S9, the controller 7 sets a torque shifting target time period of the power generation motor 4 in a first half of a torque shifting. In the step S10, the controller 7 sets a holding torque of the power generation motor 4 in the first half of the torque shifting. In a step S11, the controller 7 sets a torque shifting target time period of the traveling motor 2 in a second half of the torque shifting. These parameters will be described by referring to FIG. 6 to FIG. 8.

Figure 6:
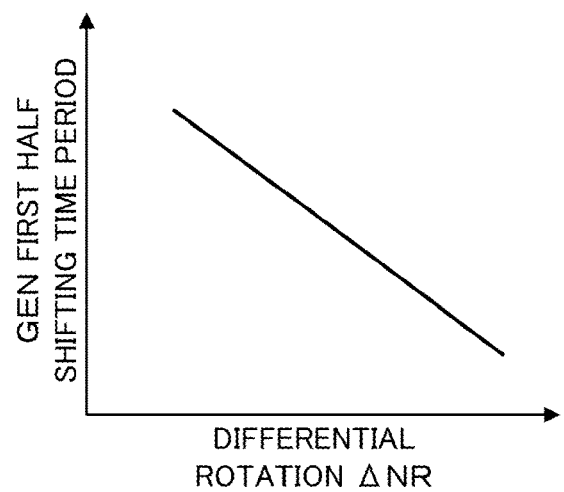
FIG. 6 is a view illustrating one example of map data used in the first example.
Figure 7:
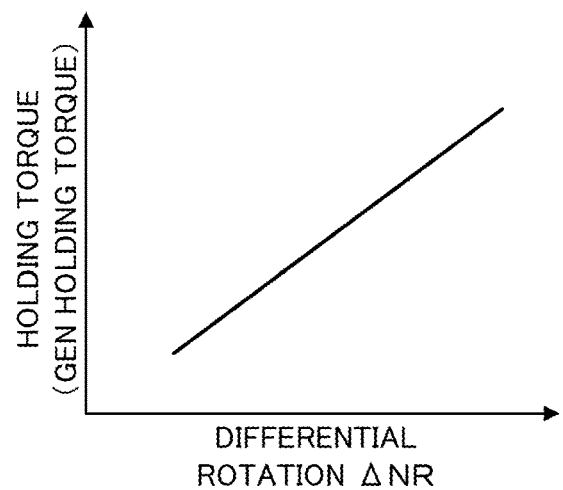
FIG. 7 is a view illustrating one example of map data used in the first example.
Figure 8:
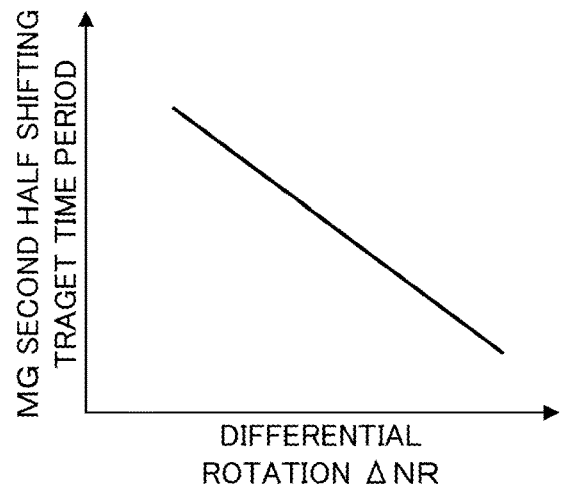
FIG. 8 is a view illustrating one example of map data used in the first example.

FIG. 6 to FIG. 8 are views illustrating various map data. In FIG. 6 to FIG. 8, a GEN first half shifting target time period, the holding torque, and an MG second half shifting target time period are set as various parameters. The GEN first half shifting target time period is the torque shifting target time period of the power generation motor 4 in the first half of the torque shifting, and GEN indicates the power generation motor 4. The holding torque is the holding torque of the power generation motor 4 in the first half of the torque shifting. The MG second half shifting target time period is the torque shifting target time period of the traveling motor 2 in the second half of the torque shifting, and MG indicates the traveling motor 2. FIG. 6 to FIG. 8 illustrate change trends of the various parameters depending on the differential rotation ΔNR. In this embodiment, in light of a torque variation aspect of the drive shaft, a case where the shifting of the torque is divided into the first half of the shifting and the second half of the shifting is exemplified.

Here, the first half shifting target time period of the torque shifting corresponds to, for example, a half of a vibration cycle of the drive shaft, and the vibration cycle is determined by a natural frequency of the power transmission path that is a vibration system connecting between the power source and the driving wheels 6. From this, the first half shifting target time period of the torque shifting can be preset for each meshing clutch mechanism.

On the other hand, in order to suppress the vibration of the drive shaft, a difference in an absolute value of a slope of the torque in the first half of the torque shifting between the traveling motor 2 and the power generation motor 4 should be increased. Then, an amplitude of an expected drive shaft torque variation is indexed by the differential rotation ΔNR.

From this, the difference in the absolute value of the slope of the torque between the traveling motor 2 and the power generation motor 4 can be set on the basis of the amplitude of the expected drive shaft torque variation, that is, the differential rotation ΔNR. Based on the above, in this embodiment, the slope of a torque increase of the power generation motor 4 in the first half of the torque shifting is calculated as follows.

That is, the slope of a torque decrease of the traveling motor 2 in the first half of the torque shifting is separately calculated as the slope for releasing the motor clutch 19 after one cycle of the vibration from the aspect of the above-described natural frequency. Then, the slope of the torque increase of the power generation motor 4 in the first half of the torque shifting is calculated on the basis of the above-described difference in the absolute value of the slope of the torque between the traveling motor 2 and the power generation motor 4 and the slope of the torque decrease of the traveling motor 2 in the first half of the torque shifting. Furthermore, the amplitude of the expected drive shaft torque variation increases as the differential rotation ΔNR is large.

From this, the GEN first half shifting target time period is set to become shorter as the differential rotation ΔNR is large as illustrated in FIG. 6, whereby the slope of the torque increase of the power generation motor 4 further changes depending on the differential rotation ΔNR.

As the differential rotation ΔNR increases, the GEN first half shifting target time period that determines the slope of the torque increase of the power generation motor 4 becomes shorter. Therefore, the slope of the torque increase of the power generation motor 4 increases in the absolute value as the differential rotation ΔNR increases. The GEN first half shifting target time period may be set to a fixed time period, for example, a time period equivalent to a quarter cycle of the vibration cycle and the like from the aspect of the above-described natural frequency. A case where such a setting is performed is also included in being on the basis of the drive shaft torque variation.

The holding torque is a torque for holding the torque of the power generation motor 4 when the amplitude of the vibration of the drive shaft reaches the maximum in the first half of the torque shifting and is preset. As illustrated in FIG. 7, the holding torque is further set to be increased as the differential rotation ΔNR is large, that is, the amplitude of the expected drive shaft torque vibration is large. The torque of the power generation motor 4 is held at the holding torque by becoming equal to or more than the holding torque set in this way.

In order to suppress the vibration of the drive shaft, the slope of the torque decrease of the traveling motor 2 in the second half of the torque shifting is calculated in a similar way to the slope of the torque increase of the power generation motor 4 in the first half of the torque shifting. Furthermore, the amplitude of the expected drive shaft torque vibration increases as the differential rotation ΔNR is large.

From this, the MG second half shifting target time period is set to become shorter as the differential rotation ΔNR is large as illustrated in FIG. 8, whereby the slope of the torque decrease of the traveling motor 2 further changes depending on the differential rotation ΔNR.

As the differential rotation ΔNR increases, the MG second half shifting target time period that determines the slope of the torque decrease of the traveling motor 2 becomes shorter. Therefore, the slope of the torque decrease of the traveling motor 2 increases in the absolute value as the differential rotation ΔNR is large.

Note that a degree of damping of the vibration of the drive shaft differs depending on the vehicle. In view of this, the number of the vibration of the aspect generated in the first half of the shifting in this embodiment and the number of the vibration of the aspect generated in the second half of the shifting in this example differs depending on the vehicle, for example, following the vibration generated in the second half of the shifting in this embodiment, the vibration of the aspect generated in the first half of the shifting in this embodiment is repeated again.

In the step S9 to the step S11 of the flowchart illustrated in FIG. 4, by referring to these map data, the GEN first half shifting target time period, the holding torque of the power generation motor 4 in the first half of the torque shifting, and the MG second half shifting target time period are set.

When the processing transitions to a step S12, the controller 7 starts the processing of a driving torque shifting command, whereby the shifting of the torque is started. The processing of the step S12 is performed by a subroutine illustrated in FIG. 5 corresponding to the completion of the engagement of the engine clutch 21.

As illustrated in FIG. 5, in a step S101, the controller 7 performs the driving torque shifting command of the traveling motor 2. In the step S101, a MG first half command torque is computed, and the driving torque shifting command is performed on the basis of the computed MG first half command torque. The MG first half command torque is a command torque in the first half of the torque shifting of the traveling motor 2 and is computed by the following Math. 1.

$$\text{MG first half command torque} = \text{MIN}(\text{MG first half target torque}, (\text{MG first half target torque} - \text{MG first half command torque previous value})/(\text{MG first half shifting target time period} - \text{MG first half shifting elapsed time period})) + \text{MG first half command torque previous value} \quad [\text{Math. 1}]$$

The MG first half target torque in Math. 1 is set to be lower than the torque at the start of switching the power transmission path, that is, the original torque, in order to decrease the torque of the traveling motor 2 arranged in the first power transmission path 24 that is the power transmission path before switching. The MG first half shifting target time period is preset on the basis of a natural frequency of the first power transmission path 24 that is a vibration system connecting between the traveling motor 2 and the driving wheels 6.

The "MG first half target torque-MG first half command torque previous value" in Math. 1 indicates the remaining torque until the MG first half target torque is reached. The "MG first half shifting target time period-MG first half shifting elapsed time period" indicates the remaining time period until the MG first half shifting target time period is reached. Therefore, the "(MG first half target torque-MG first half command torque previous value)/(MG first half shifting target time period-MG first half shifting elapsed time period)" indicates the torque that is increased from hour to hour and corresponds to the slope of the torque change of the traveling motor 2.

By adding the torque that is increased from hour to hour to the previous value of the MG first half command torque, an MG first half command torque that should be instructed next can be obtained. However, the MG first half command torque is not the torque that exceeds the MG first half target torque. In view of this, in Math. 1, the smaller one of the MG first half command torque that should be instructed next and the MG first half target torque is computed as a new MG first half command torque. The torque, such as the MG first half command torque, can be converted into a torque on the drive shaft by multiplying a gear ratio (input rotation speed/output rotation speed) set in the power transmission path connecting between the power source and the drive shaft, whereby the torque can be used as the torque on the drive shaft. The MG first half command torque is controlled for each control cycle with which the Math. 1 is computed, whereby the slope of the torque decrease of the traveling motor 2 in the first half of the torque shifting is formed and calculated into the slope for releasing the motor clutch 19 after one cycle of the vibration.

In a step S102, the controller 7 determines whether or not the MG first half shifting elapsed time period becomes equal to or more than the MG first half shifting target time period. This kind of determination may be performed using, for example, the torque or the rotation speed, instead of the time period. When a negative determination is made in the step S102, the processing returns to the step S101. When a positive determination is made in the step S102, it is determined that the torque shifting of the traveling motor 2 in the first half of the torque shifting is completed, and the processing proceeds to a step S103.

In the step S103, the controller 7 performs the driving torque shifting command of the traveling motor 2. In the step S103, an MG second half command torque that is a command torque in the second half of the torque shifting of the traveling motor 2 is computed, and the driving torque shifting command is performed on the basis of the computed MG second half command torque. The MG second half command torque is computed by the following Math. 2.

$$\text{MG second half command torque} = \text{MIN}(\text{MG second half target torque}, (\text{MG second half target torque} - \text{MG second half command torque previous value})/(\text{MG second half shifting target time period} - \text{MG second half shifting elapsed time period})) + \text{MG second half command torque previous value} \quad [\text{Math. 2}]$$

After the switching of the power transmission path to the second power transmission path 25 is completed, the torque of the traveling motor 2 becomes unnecessary. In view of this, the MG second half target torque in Math. 2 is set to, for example, zero. The MG second half shifting target time period is preset by the map data illustrated in FIG. 8 described above.

The processing of the step S103 is repeatedly performed until the MG second half shifting target time period elapses, whereby the torque shifting of the traveling motor 2 in the second half of the torque shifting is completed. The MG second half command torque is controlled for each control cycle with which Math. 2 is computed, whereby the slope of the torque decrease of the traveling motor 2 depending on the amplitude of the expected drive shaft torque variation is formed and calculated. The slope of the torque decrease of the traveling motor 2 formed in this way increases in the absolute value with respect to the slope of the torque increase of the power generation motor 4 formed on the basis of Math. 4 described later.

In a step S104, the controller 7 performs a release command of the motor clutch 19. This starts the release of the motor clutch 19. Once the torque shifting of the traveling motor 2 in the second half of the torque shifting is completed, the release command of the motor clutch 19 is performed without waiting for the completion of the torque shifting of the power generation motor 4 in the second half of the torque shifting described later, and the switching of the power transmission path is performed promptly by that amount.

In a step S105, the controller 7 determines whether or not the release of the motor clutch 19 is completed. When a negative determination is made in the step S105, the processing returns to the step S105. When a positive determination is made in the step S105, it is determined that the switching of the power transmission path is completed, and the processing proceeds to a step S106.

In the step S106, the controller 7 performs a vibration damping control of the power generation motor 4. In the step S106, the vibration damping control of the power generation motor 4 is performed by the FF control and the FB control, whereby the vibration damping of the drive shaft is ensured.

The processing from the step S101 to step S106 is performed concurrently with processing from a step S107 to a step S111 and further processing of a step S112. Although, in this flow chart, these processing are indicated in parallel with one another for convenience of explanation, it is only necessary for these processing to be configured to be substantially performed concurrently with one another.

In the step S107, the controller 7 performs the driving torque shifting command of the power generation motor 4. In the step S107, a GEN first half command torque is computed, and the driving torque shifting command is performed on the basis of the computed GEN first half command torque. The GEN first half command torque is a command torque in the first half of the torque shifting of the power generation motor 4 and is computed by the following Math. 3.

$$\begin{aligned}\text{GEN first half command torque}=\text{MIN}(&\text{GEN first half target torque, (GEN first half target torque}-\\&\text{GEN first half command torque previous}\\&\text{value)/(GEN first half shifting target time}\\&\text{period}-\text{GEN first half shifting elapsed time}\\&\text{period))}+\text{GEN first half command torque previous value}\end{aligned}$$ [Math. 3]

The GEN first half target torque in Math. 3 is set to be higher than the original torque in order to increase the torque of the power generation motor 4 that is the power source after switching. The GEN first half shifting target time period is preset in the map data illustrated in FIG. 6 described above. The GEN first half command torque is controlled for each control cycle with which Math. 3 is computed, whereby the slope of the torque increase of the power generation motor 4 depending on the amplitude of the expected drive shaft torque variation is formed and calculated. The slope of the torque increase of the power generation motor 4 formed in this way increases in the absolute value with respect to the slope of the torque decrease of the traveling motor 2 formed on the basis of Math. 1.

In a step S108, the controller 7 determines whether or not the GEN first half command torque is equal to or more than the holding torque. When a negative determination is made in the step S108, the processing returns to the step S107. When a positive determination is made in the step S108, it is determined that the torque shifting of the power generation motor 4 in the first half of the torque shifting is completed, and the processing proceeds to a step S109.

In the step S109, the controller 7 sets the GEN first half command torque to the holding torque. This causes the torque of the power generation motor 4 to be held at the holding torque.

In a step S110, the controller 7 determines whether or not the MG first half shifting elapsed time period becomes equal to or more than the MG first half shifting target time period. When a negative determination is made in the step S110, the processing returns to the step S110. When a positive determination is made in the step S110, the processing proceeds to the step S111.

In the step S111, the controller 7 performs the driving torque shifting command of the power generation motor 4. In the step S111, a GEN second half command torque is computed, and the driving torque shifting command is performed on the basis of the computed GEN second half command torque. The GEN second half command torque is computed by the following Math. 4.

$$\begin{aligned}\text{GEN second half command torque}=\text{MIN}(&\text{GEN second half target torque, (GEN second half target torque}-\text{GEN second half command torque previous value)/(GEN second half shifting target time period}-\text{GEN second half shifting elapsed time period))}+\text{GEN second half command torque previous value}\end{aligned}$$ [Math. 4]

The GEN second half target torque in Math. 4 is set to be higher than the holding torque in order to increase the torque of the power generation motor 4. The GEN second half shifting target time period is preset on the basis of a natural frequency of the second power transmission path 25 that is a vibration system connecting between the power generation motor 4 and the driving wheels 6. The processing of the step S111 is repeatedly performed until the GEN second half shifting target time period elapses, whereby the slope of the torque increase of the power generation motor 4 in the second half of the torque shifting is formed and calculated into the slope for releasing the motor clutch 19 after one cycle of the vibration.

In the step S112, the controller 7 performs the driving torque shifting command of the internal combustion engine 3. In the step S112, an ICE command torque is computed, and the driving torque shifting command is performed on the basis of the computed ICE command torque. The ICE command torque is a command torque of the torque shifting of the internal combustion engine 3, and ICE indicates the internal combustion engine 3. The ICE command torque is computed by the following Math. 5.

$$\begin{aligned}\text{ICE command torque}=\text{MIN}(&\text{ICE target torque, (ICE target torque}-\text{ICE command torque previous value)/(ICE shifting target time period}-\text{ICE shifting elapsed time period))}+\text{ICE command torque previous value}\end{aligned}$$ [Math. 5]

In this embodiment, the power generation motor 4 plays a role in the shifting of the torque on the second power transmission path 25 side. In view of this, the ICE target torque is the toque at the start of switching the power transmission path. Consequently, the ICE command torque is maintained at the torque at the start of switching the power transmission path by Math. 5. The ICE shifting target time period can be, for example, a preset constant value. The processing of the step S112 is repeatedly performed until the ICE shifting target time period elapses, whereby the torque shifting processing for the internal combustion engine 3 is completed.

The subroutine illustrated in FIG. 5 ends when the respective driving torque shifting commands of the traveling motor 2, the power generation motor 4, and the internal combustion engine 3 are completed, whereby the processing of the flowchart illustrated in FIG. 4 also ends.

Figure 9:
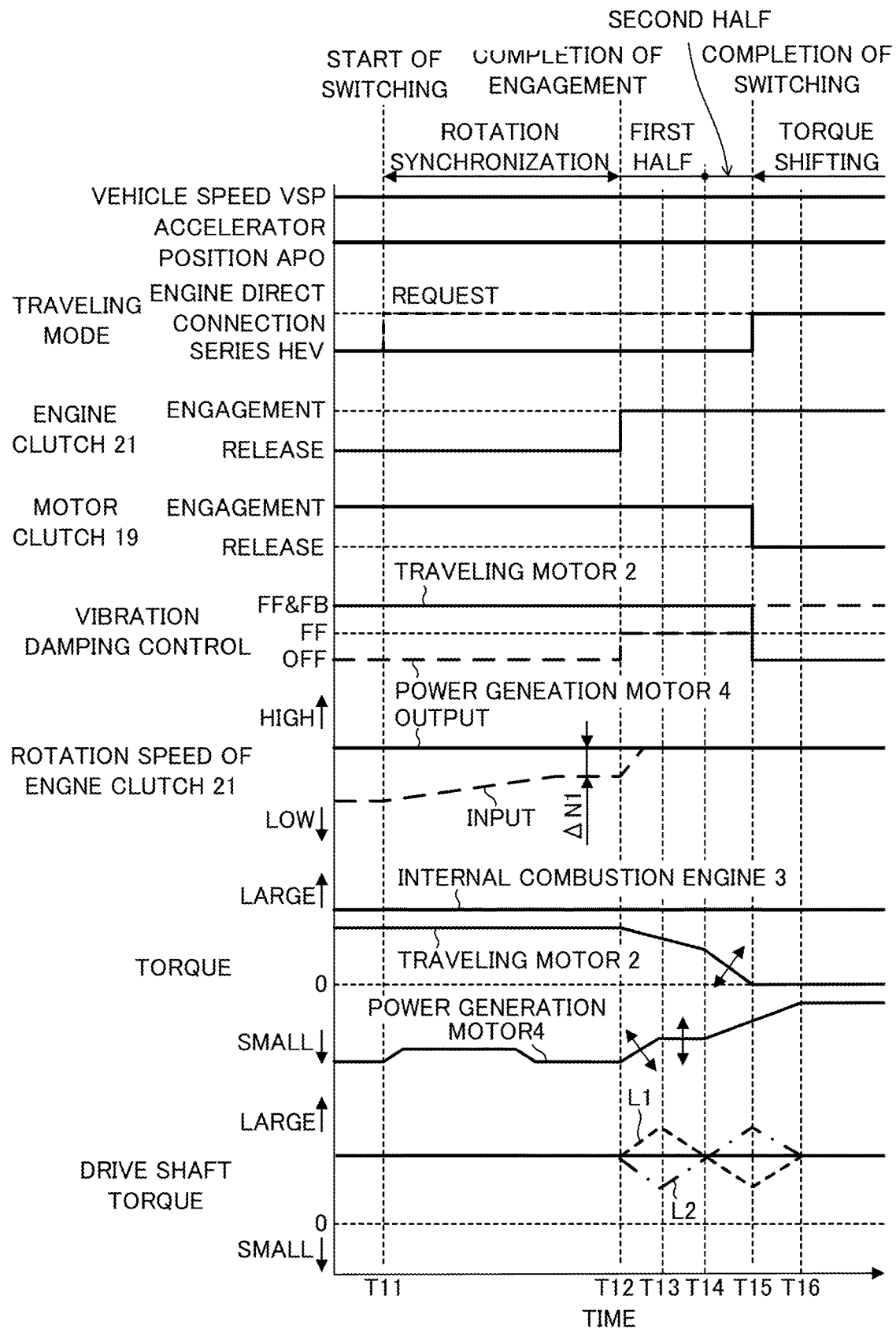
FIG. 9 is a view illustrating one example of a timing chart corresponding to the first example.

FIG. 9 is a view illustrating one example of a timing chart corresponding to the flowcharts illustrated in FIG. 4 and FIG. 5. The torques of the traveling motor 2, the internal combustion engine 3, and the power generation motor 4 indicate the torques in the drive shaft.

Before a timing T11, the traveling mode is the series HEV mode. In the series HEV mode, the vibration damping control by the FF control and the FB control is performed in the traveling motor 2. In the power generation motor 4 where the power transmission with the driving wheels 6 is cut off, the vibration damping control is not performed.

In the timing T11, the request to switch the traveling mode from the series HEV mode to the engine direct connection mode is performed. In view of this, the switching of the power transmission path is started, and the torque of the power generation motor 4 starts to increase for the rotation synchronization of the engine clutch 21. This causes the input rotation speed of the engine clutch 21 to start to rise, and the rotation synchronization is started.

When the magnitude of the differential rotation ΔNR in the engine clutch 21, that is, the magnitude of the differential rotation ΔNR between the input rotation speed and the output rotation speed of the engine clutch 21 becomes less than the predetermined value ΔNR1, the engagement of the engine clutch 21 starts accordingly. This causes the actuation for engaging with the actuator that actuates the engine clutch 21 to be commanded, the actuator and the engine clutch 21 are actually actuated, and the engine clutch 21 is engaged. Then, once the engine clutch 21 is engaged, the completion of the engagement of the engine clutch 21 is determined by a signal from the clutch sensor.

A timing T12 is a timing at which the completion of the engagement of the engine clutch 21 is determined in this way, and the shifting of the torque starts from the timing T12. This causes the torque of the traveling motor 2 to start to decrease and the torque of the power generation motor 4 to start to increase. The torque of the internal combustion engine 3 is constant.

Furthermore, at the timing T12, the vibration damping control of the power generation motor 4 by the FF control is started. This can ensure the vibration damping of the power generation motor 4 while avoiding an interference of the FB control with the FB control performed in the traveling motor 2 during the torque shifting. Further, by thus ensuring the vibration damping of the power generation motor 4 during the torque shifting, the vibration damping of the drive shaft can be ensured.

At a timing T13, the torque of the power generation motor 4 reaches the holding torque. This causes the torque shifting of the power generation motor 4 in the first half of the shifting to be completed, and the torque of the power generation motor 4 is held at the holding torque.

At a timing T14, the MG first half shifting target time period elapses from the timing T12 to be in the second half of the torque shifting. Consequently, the torque of the traveling motor 2 starts to decrease with a steeper slope than the torque in the first half of the torque shifting. Further, the torque of the power generation motor 4 that has been at the holding torque starts to increase again.

At a timing T15, the torque shifting of the traveling motor 2 in the second half of the shifting is completed, and the torque of the traveling motor 2 becomes zero. This allows for releasing the motor clutch 19 that is a dog clutch, and the motor clutch 19 is released. Consequently, the switching of the power transmission path is completed, and the traveling mode is set to the engine direct connection mode.

From the timing T15, the driving wheels 6 do not get driven by the traveling motor 2 that is the power source before switching. In view of this, from the timing T15, the vibration damping control of the traveling motor 2 is cancelled, and the vibration damping control of the power generation motor 4 is performed by the FF control and the FB control.

In this example, from the timing T12 to the timing T15 are after an engagement timing of the engine clutch 21 that constitutes the clutch after switching (clutch on the engagement side) between the motor clutch 19 and the engine clutch 21, and before a release timing of the motor clutch 19 that constitutes the clutch before switching (clutch on the release side).

The torque of the power generation motor 4 continues to increase even after the timing T15 and becomes constant at a timing T16 at which the GEN second half shifting target time period elapses from the timing T14.

Here, the timing T16 is a timing at which one cycle of the vibration of the drive shaft determined from the natural frequency of the vibration system ends. The timing at which one cycle of the vibration of the drive shaft ends such as this is a timing at which a twist angle of the drive shaft in association with the vibration becomes zero.

Therefore, assume that the slopes of the torques of the traveling motor 2 and the power generation motor 4 are controlled to have a slope for simultaneously achieving two factors in which the torque transmitted by the motor clutch 19 is made to zero at this timing T16 while the vibration of the drive shaft is suppressed. That is, the slopes of the torques are controlled to have a slope for releasing the motor clutch 19 after one cycle of the vibration. The twist angle of the drive shaft in association with the vibration becomes zero even when the engine clutch 21 is released, and the twist angle does not suddenly change after the release of the engine clutch 21.

Since such a timing suitable for the release of the engine clutch 21 occurs every 0.5 cycles, the engine clutch 21 can be also released at the timing T14 corresponding to 0.5 cycles, for example, in the case of a vehicle using a drive shaft that vibrates in a sufficiently long cycle.

In this embodiment, the slope of the torque increase of the power generation motor 4 in the first half of the torque shifting and the slope of the torque decrease of the traveling motor 2 in the second half of the torque shifting are controlled as described above. This allows for releasing the engine clutch 21 promptly at the timing T15 that is earlier than the timing T16 while suppressing the vibration of the drive shaft. This is specifically explained as follows.

In the case of a comparative example in which the control of the slope of this embodiment is not applied, as a result of the drive shaft torque dropping from the timing T12 as indicated by a one-dot chain line L2 in association with the engine clutch 21 having been engaged, the drive shaft vibrates. In this example, from the timing T12 to the timing T14 is a period when the drive shaft vibrates in association with the engagement of the engine clutch 21 and the torque transmitted by the drive shaft is smaller than the torque at the timing T11 that is at the start of switching the power transmission path.

In the case of this embodiment, by being on the basis of such a torque variation of the drive shaft via the differential rotation ΔNR immediately before the engagement of the engine clutch 21, in the first half of the torque shifting, that is, in the period from the timing T12 to the timing T14, the slope of the torque increase of the power generation motor 4 is increased in the absolute value with respect to the slope of the torque decrease of the traveling motor 2.

This allows for providing a total torque of the respective power sources of the traveling motor 2, the internal combustion engine 3, and the power generation motor 4 indicated by a dashed line L1 to the drive shaft. Further, since the slope of the torque increase of the power generation motor 4 at this time is changed depending on the differential rotation ΔNR, the total torque of the respective driving sources can be appropriately provided to the drive shaft. Consequently, the variation of the drive shaft torque is appropriately suppressed as indicated by a solid line, and the vibration of the drive shaft is appropriately suppressed.

The slope of the torque increase of the power generation motor 4 may be increased in the absolute value with respect to the slope of the torque decrease of the traveling motor 2 in at least a part of the period from the timing T12 to the timing T14. The description of "in at least a part" includes allowing a case where this period does not completely match the period for which the slope is varied, due to control responsiveness and the like.

In the case of the comparative example, the amplitude on a drop side of the drive shaft torque becomes maximum at the timing T13 as indicated by the one-dot chain line L2, and the variation of the drive shaft torque shifts from a drop to a rise.

In this embodiment, the torque of the power generation motor 4 reaches the holding torque at the timing T13 and is held at the holding torque. This allows the total torque of the respective power sources to drop depending on the rise of the drive shaft torque indicated by the one-dot chain line L2. Consequently, the variation of the drive shaft torque is appropriately suppressed as indicated by the solid line, and the vibration of the drive shaft is appropriately suppressed. Further, since the holding torque at this time is changed depending on the differential rotation ΔNR, the total torque of the respective driving sources can be appropriately provided to the drive shaft. The vibration of the drive shaft can be suppressed by not decreasing the torque of the power generation motor 4 in the first half of the torque shifting, including holding the torque of the power generation motor 4 at the holding torque.

The torque of the power generation motor 4 may be made not to be decreased in at least a part of the period from the timing T12 to the timing T14. The description of "in at least a part" is the same as that described above.

When the vibration of the drive shaft is suppressed in the first half of the torque shifting as described above, the switching of the power transmission path can be completed at the timing T16 similarly to the case of the comparative example even in a case where the vibration of the drive shaft is not dealt with in the second half of the torque shifting. Consequently, in this case, the switching of the power transmission path can be performed without delay as compared with the case of the comparative example while suppressing the vibration of the drive shaft. Alternatively, in the case of a vehicle using a drive shaft that vibrates in a sufficiently long cycle, on the premise that the slopes of the traveling motor 2 and the power generation motor 4 are controlled to the slope for releasing the motor clutch 19 at the timing T14 that is 0.5 cycles after the vibration, the switching of the power transmission path can be also performed more promptly than in the case of the comparative example by controlling so that the slope of the torque increase of the power generation motor 4 becomes larger in the absolute value than the slope of the torque decrease of the traveling motor 2.

In the case of the comparative example, the drive shaft torque indicated by the one-dot chain line L2 varies to a higher side than the original drive shaft torque at the timing T14 that is in the second half of the torque shifting. In this example, from the timing T14 to the timing T16 is a period when the drive shaft vibrates in association with the engagement of the engine clutch 21 and the torque transmitted by the drive shaft is larger than the torque at the start of switching the power transmission path.

In this embodiment, by being on the basis of such a torque variation of the drive shaft via the differential rotation ΔNR, in the second half of the torque shifting, that is, in the period from the timing T14 to the timing T15, the slope of the torque decrease of the traveling motor 2 is increased in the absolute value with respect to the slope of the torque increase of the power generation motor 4.

This allows for decreasing the total torque of the respective power sources indicated by the dashed line L1 below the original drive shaft torque so as to be provided to the drive shaft. Further, since the slope of the torque decrease of the traveling motor 2 at this time is changed depending on the differential rotation ΔNR, the total torque of the respective driving sources can be appropriately provided to the drive shaft. Consequently, the variation of the drive shaft torque is appropriately suppressed as indicated by the solid line, and the vibration of the drive shaft is appropriately suppressed.

The slope of the torque decrease of the traveling motor 2 may be increased in the absolute value with respect to the slope of the torque increase of the power generation motor 4 in at least a part of the period from the timing T14 to the timing T16. The description of "in at least a part" is the same as that described above.

In the case of the comparative example, the amplitude on the increase side of the drive shaft torque becomes maximum at the timing T15 as indicated by the one-dot chain line L2, and the variation of the drive shaft torque shifts from the rise to lowering.

In the case of this embodiment, the torque of the traveling motor 2 becomes zero at the timing T15. In view of this, the total torque of the respective power sources shifts to the rise from the timing T15 as indicated by the dashed line L1. Consequently, the variation of the drive shaft torque is appropriately suppressed as indicated by the solid line, and the vibration of the drive shaft is appropriately suppressed.

When the vibration of the drive shaft is suppressed in the second half of the torque shifting as described above, a time period of the switching of the power transmission path can be made shorter than a time period in the case of the comparative example by the time period between the timing T15 and the timing T16 even in a case where the vibration of the drive shaft is not dealt with in the first half of the torque shifting. Consequently, in this case, the switching of the power transmission path can be performed more promptly than in the case of the comparative example while suppressing the vibration of the drive shaft.

In this embodiment, the slope of the torque increase of the power generation motor 4 is increased in the absolute value with respect to the slope of the torque decrease of the traveling motor 2, and in addition, the slope of the torque decrease of the traveling motor 2 is increased in the absolute value with respect to the slope of the torque increase of the power generation motor 4 in the second half of the torque shifting. This allows for suppressing the variation of the drive shaft torque throughout the time period of torque shifting as indicated by the solid line and performing the switching of the power transmission path more promptly than in the case of the comparative example.

Next, main operational advantages of this embodiment will be described.

Here, the release of the meshing clutch mechanism becomes possible by the torque transmitted by the meshing clutch mechanism decreasing to near zero. In view of this, in order to promptly release the meshing clutch mechanism, the torque that should be decreased needs to reach the torque after the completion of the shifting, that is, near zero without delay.

The power transmission method for a vehicle according to this embodiment is used in a vehicle including the power generation motor 4 driven by the power of the internal combustion engine 3, the traveling motor 2 driving the driving wheels 6 by the electric power generated by the power generation motor 4, the first power transmission path 24 transmitting the power between the traveling motor 2 and the driving wheels 6, the motor clutch 19 configured to connect or disconnect the power transmission of the first power transmission path 24, the second power transmission path 25 configured to mechanically transmit the power of the internal combustion engine 3 to the driving wheels 6, and the engine clutch 21 configured to connect or disconnect the power transmission of the second power transmission path 25. In the vehicle, the driving wheels 6 are driven by the power of the internal combustion engine 3 or the power of the traveling motor 2, and the traveling motor 2 arranged in the first power transmission path 24 and the internal combustion engine 3 and the power generation motor 4 arranged in the second power transmission path 25 constitute the power sources. The power transmission method for a vehicle according to this embodiment performs, on the basis of the torque variation of the drive shaft after the engagement timing of the engine clutch 21 and before the release timing of the motor clutch 19 at the time of switching the power transmission path from the first power transmission path 24 to the second power transmission path 25, increasing the slope of the torque increase of the power generation motor 4 in the absolute value with respect to the slope of the torque decrease of the traveling motor 2 in the period when the drive shaft vibrates in association with the engagement of the engine clutch 21 and the torque transmitted by the drive shaft is smaller than the torque at the start of switching the power transmission path, and increasing the slope of the torque decrease of the power generation motor 4 in the absolute value with respect to the slope of the torque increase of the traveling motor 2 in the period when the drive shaft vibrates in association with the engagement of the engine clutch 21 and the torque transmitted by the drive shaft is larger than the torque at the start of switching the power transmission path.

With the method such as this, by increasing the slope of the torque increase of the power generation motor 4 in the absolute value with respect to the slope of the torque decrease of the traveling motor 2, performing the switching of the power transmission path without delay while suppressing the vibration of the drive shaft becomes possible. Further, with the method such as this, by increasing the slope of the torque decrease of the traveling motor 2 in the absolute value with respect to the slope of the torque increase of the power generation motor 4, promptly performing the switching of the power transmission path while suppressing the vibration of the drive shaft becomes possible. Furthermore, with the method such as this, since, by performing both of these, the vibration of the drive shaft is suppressed throughout the time period of the torque shifting and the torque that should be decreased promptly reaches the torque after the completion of the shifting, that is, near zero, promptly performing the switching of the power transmission path becomes possible.

That is, with the method such as this, since releasing the motor clutch 19 disposed in the first power transmission path 24 promptly or without delay becomes possible, switching the power transmission path without delay while suppressing the vibration of the drive shaft becomes possible.

In the power transmission method for a vehicle according to this embodiment, in the period when the drive shaft vibrates in association with the engagement of the engine clutch 21 and the torque transmitted by the drive shaft is smaller than the torque at the start of switching the power transmission path and decreases, the slope of the torque increase of the power generation motor 4 is increased in the absolute value with respect to the slope of the torque decrease of the traveling motor 2.

The above-described period corresponds to the period from the timing T12 to the timing T13 illustrated in the FIG. 9 described above, and this period is a period when the twist angle of the drive shaft periodically increases. In view of this, with the method such as this, by increasing the slope of the torque increase of the power generation motor 4 in this period as described above, releasing the motor clutch 19 promptly or without delay while suppressing the vibration of the drive shaft becomes possible.

In the power transmission method for a vehicle according to this embodiment, in the period when the drive shaft vibrates in association with the engagement of the engine clutch 21 and the torque transmitted by the drive shaft is larger than the torque at the start of switching the power transmission path and increases, the slope of the torque decrease of the traveling motor 2 is increased in the absolute value with respect to the slope of the torque increase of the power generation motor 4.

The above-described period corresponds to the period from the timing T14 to the timing T15 illustrated in the FIG. 9 described above, and this period is a period when the twist angle of the drive shaft periodically increases. In view of this, with the method such as this, by increasing the slope of the torque decrease of the traveling motor 2 in this period as described above, promptly releasing the motor clutch 19 while suppressing the vibration of the drive shaft becomes possible.

In the power transmission method for a vehicle according to this embodiment, in the period when the drive shaft vibrates in association with the engagement of the engine clutch 21 and the torque transmitted by the drive shaft decreases from the torque at the start of switching the power transmission path, the torque of the power generation motor 4 is not decreased.

With the method such as this, in light of the torque transmitted by the drive shaft decreasing below the torque at the start of switching the power transmission path in the first half of the torque shifting, suppressing the vibration of the drive shaft becomes possible.

In the power transmission method for a vehicle according to this embodiment, the slope of the torque decrease of the traveling motor 2 is varied depending on the differential rotation ΔNR.

With the method such as this, depending on the amplitude of the vibration of the drive shaft generated due to the differential rotation ΔNR, the vibration of the drive shaft can be appropriately suppressed.

Here, a vibration damping control by the FF control and the FB control is intended to suppress the vibration of the drive shaft individually in the traveling motor 2 and the power generation motor 4. That is, a cooperative vibration damping in both motors is not considered, and there is a concern about interfering with one another in the case where the power transmission path is switched. Further, even if the interference is avoided by suppressing the vibration of the drive shaft using only the FF control between the FF control and the FB control in the power generation motor 4, the power transmission path cannot be switched without delay.

In the power transmission method for a vehicle according to this embodiment, of the power generation motor 4 and the traveling motor 2, in the traveling motor 2, the FF control and the FB control are used to suppress the vibration of the drive shaft. In the power generation motor 4, of the FF control and the FB control, only the FF control is used to suppress the vibration of the drive shaft. Further, before the switching of the power transmission path starts, in the traveling motor 2, the FF control and the FB control are used to suppress the vibration of the drive shaft. After the switching of the power transmission path is completed, in the power generation motor 4, the FF control and the FB control are used to suppress the vibration of the drive shaft.

With the configuration such as this, by suppressing the vibration of the drive shaft before the switching of the power transmission path starts and after the switching of the power transmission path is completed while avoiding the interference of the FB control with the FB control performed in the traveling motor 2 during the torque shifting, the vibration of the drive shaft can be appropriately suppressed.

The power transmission method for a vehicle according to this embodiment can be applied to a case where the power transmission path is switched from the second power transmission path 25 to the first power transmission path 24, that is, a case where the switching of the traveling mode to the series HEV mode is performed.

Figure 10:
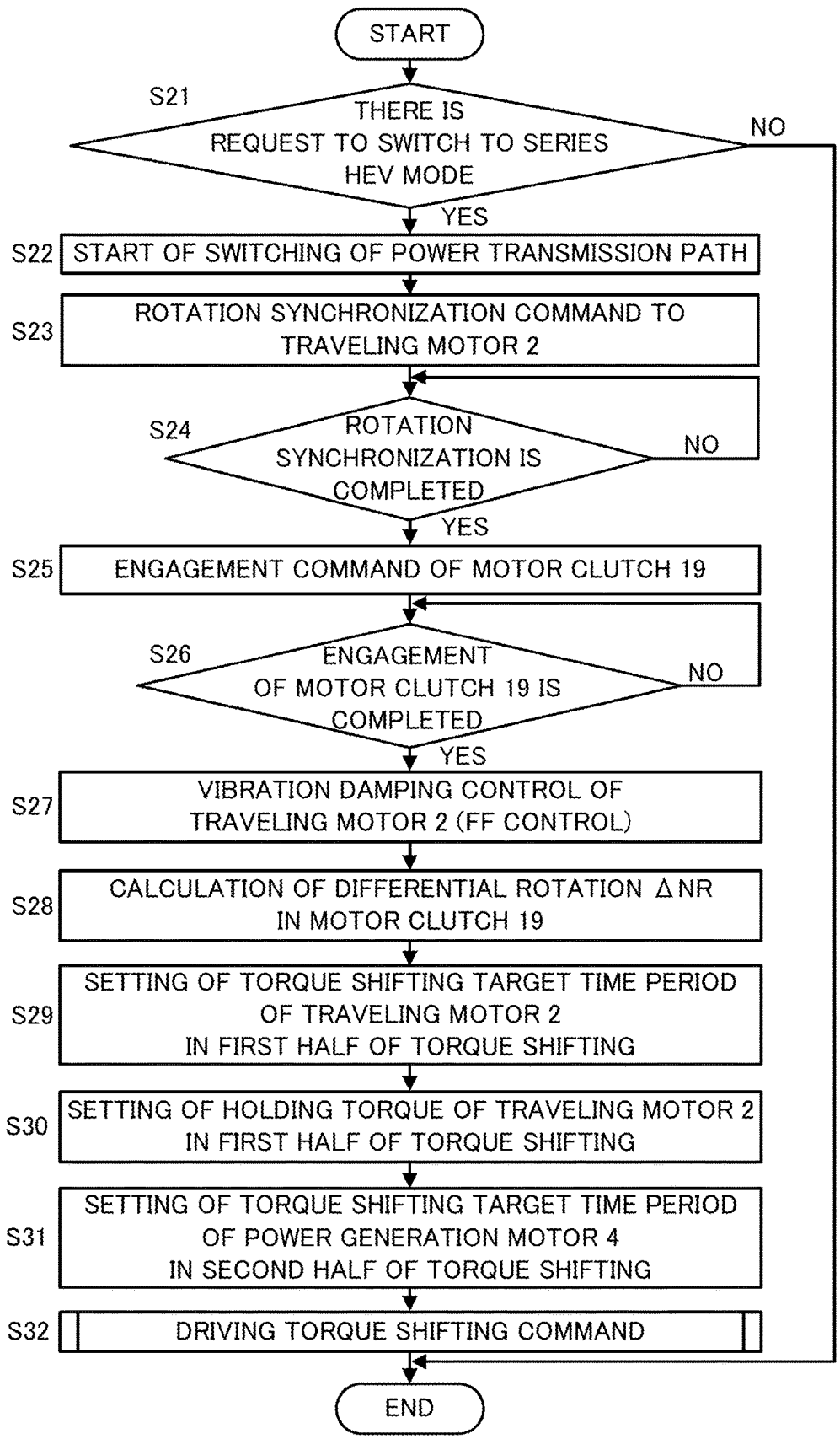
FIG. 10 is a view illustrating a flowchart of a second example of a control of the embodiment.
Figure 11:
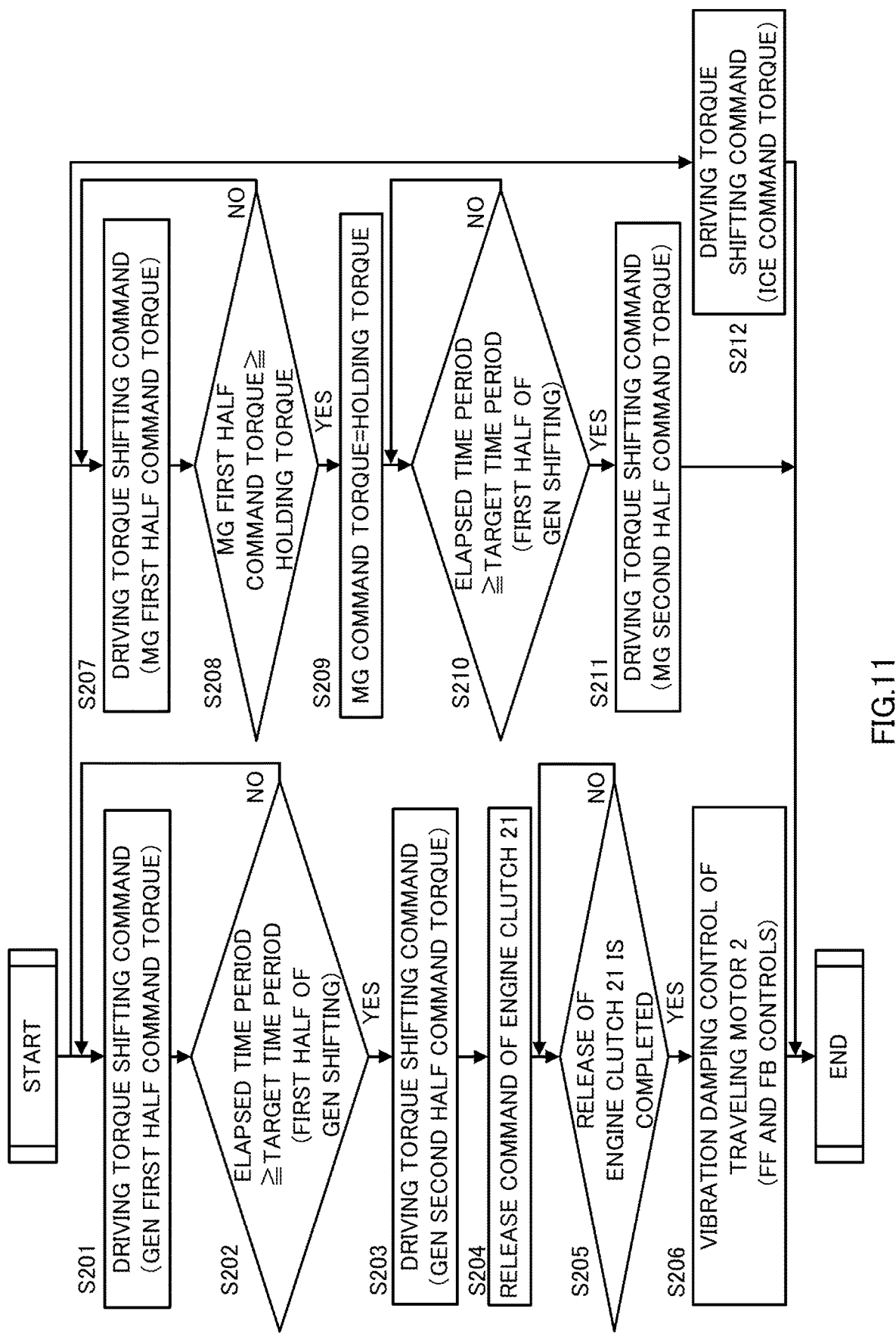
FIG. 11 is a view illustrating a part of processing of the second example by a subroutine.

FIG. 10 and FIG. 11 are views illustrating flowcharts of one example of a control that the controller 7 performs when the traveling mode is switched to the series HEV mode and correspond to FIG. 4 and FIG. 5 illustrating the control example when the power transmission path is switched to the second power transmission path 25.

As can be seen from FIG. 10 and FIG. 11, when the traveling mode is switched to the series HEV mode, the processing performed for the power generation motor 4 when the traveling mode is switched to the engine direct connection mode is performed for the traveling motor 2. Similarly, the processing performed for the traveling motor 2 is performed for the power generation motor 4. Further, the processing performed for the engine clutch 21 is performed for the motor clutch 19, and the processing performed for the motor clutch 19 is performed for the engine clutch 21.

When the traveling mode is switched to the series HEV mode, the GEN first half command torque and the GEN second half command torque are computed in a step S201 and a step S203 instead of the MG first half command torque and the MG second half command torque. Further, the MG first half command torque and the MG second half command torque are computed in a step S207 and a step S211 instead of the GEN first half command torque and the GEN second half command torque. These computations can be performed by interchanging MG and GEN in Math. 1 to Math. 4.

Figure 12:
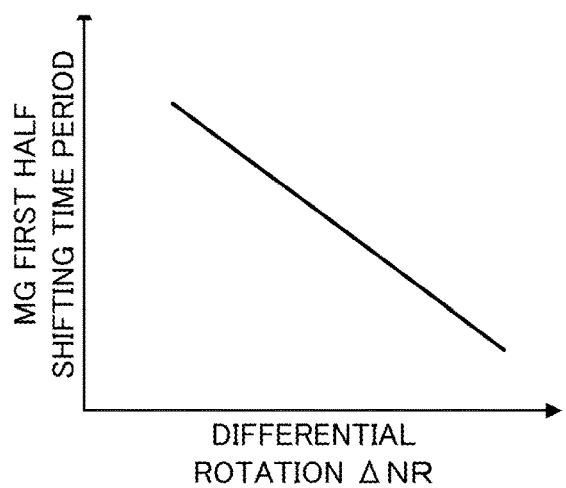
FIG. 12 is a view illustrating one example of map data used in the second example.
Figure 13:
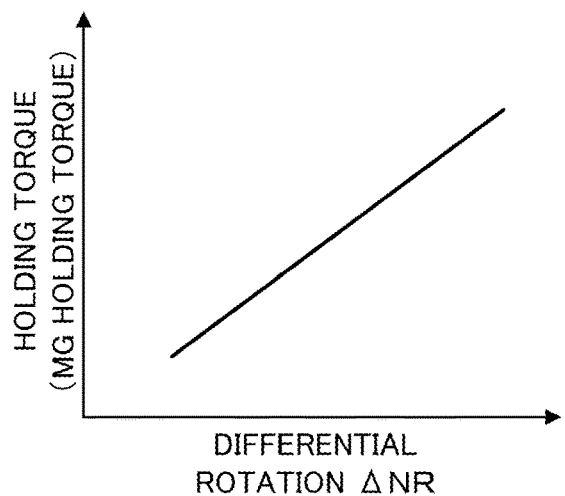
FIG. 13 is a view illustrating one example of map data used in the second example.
Figure 14:
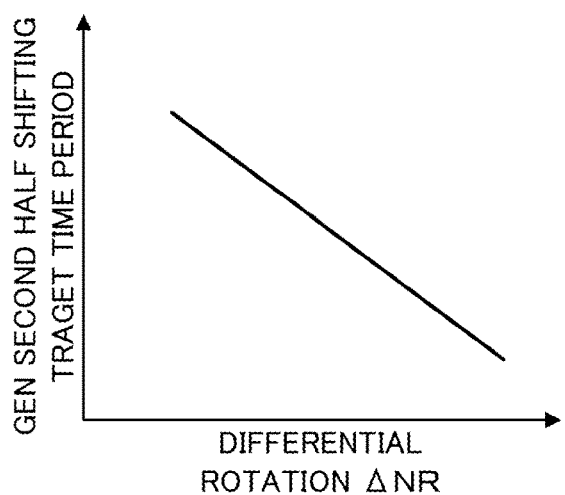
FIG. 14 is a view illustrating one example of map data used in the second example.

FIG. 12 to FIG. 14 are views illustrating various map data referred to when the traveling mode is switched to the series HEV mode and correspond to FIG. 6 to FIG. 8 illustrating the various map data referred to when the power transmission path is switched to the second power transmission path 25.

When the MG first half command torque is computed, the map data illustrated in FIG. 12 is used instead of the map data illustrated in FIG. 6. When the GEN second half command torque is computed, the map data illustrated in FIG. 14 is used instead of the map data illustrated in FIG. 8. For a computation of the holding torque, the map data illustrated in FIG. 13 is used instead of the map data illustrated in FIG. 7. In the map data illustrated in FIG. 13, the holding torque of the traveling motor 2 in the first half of the torque shifting is set instead of the holding torque of the power generation motor 4 in the first half of the torque shifting.

Figure 15:
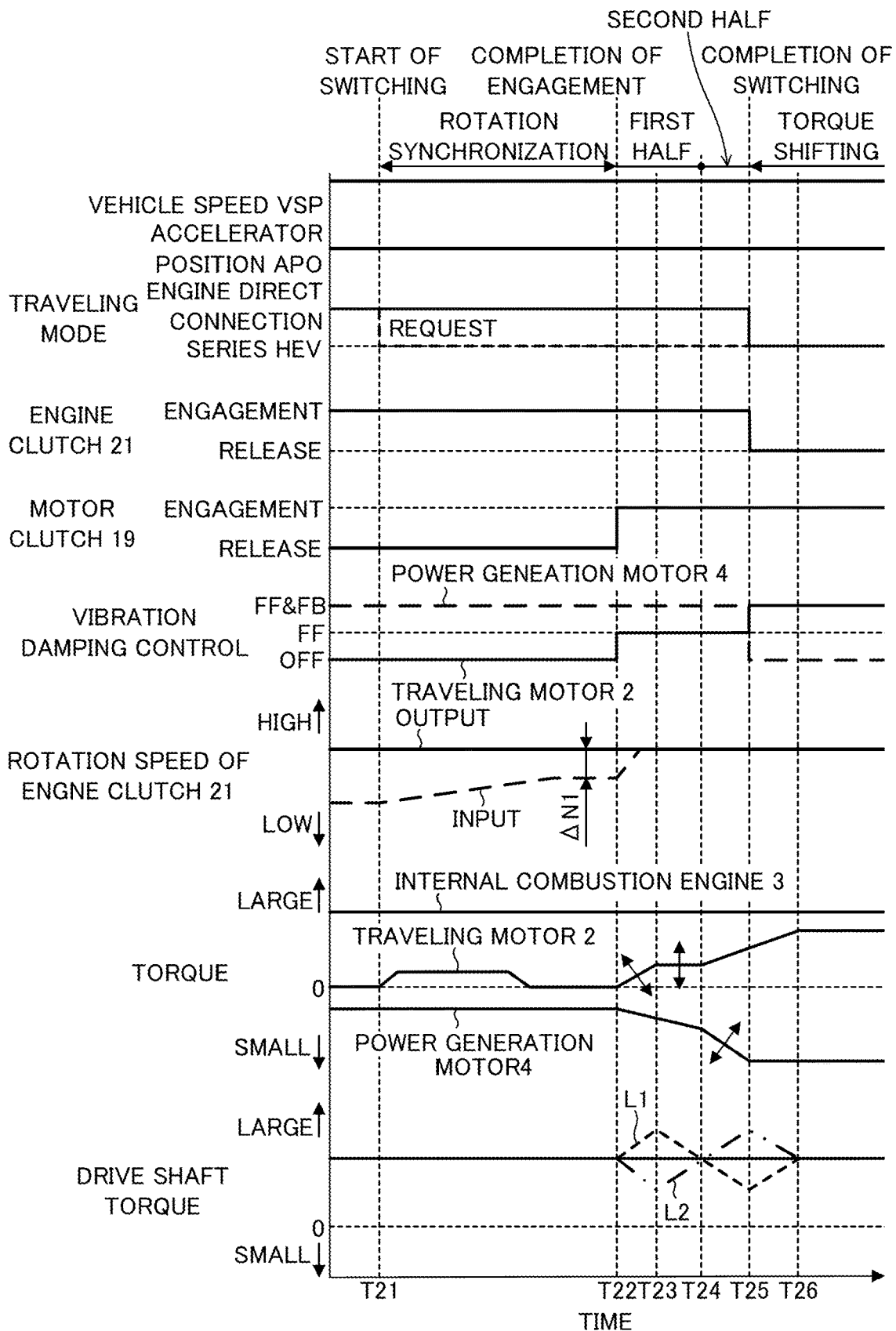
FIG. 15 is a view illustrating one example of a timing chart corresponding to the second example.

FIG. 15 is a view illustrating one example of a timing chart when the traveling mode is switched to the series HEV mode and corresponds to FIG. 9 illustrating one example of the timing chart when the power transmission path is switched to the second power transmission path 25.

When the traveling mode is switched to the series HEV mode, in the first half of the torque shifting, that is, from a timing T22 to a timing T24, the slope of the torque increase of the traveling motor 2 is increased in the absolute value with respect to the slope of the torque decrease of the power generation motor 4. Further, in the second half of the torque shifting, that is, from the timing T24 to a timing T25, the slope of the torque decrease of the traveling motor 2 is increased in the absolute value with respect to the slope of the torque increase of the power generation motor 4.

In the first half of the torque shifting, the torque of the power generation motor 4 is not decreased, including holding the torque of the traveling motor 2 at the holding torque. At the timing T25, the torque of the power generation motor 4 that plays a role in the torque shifting to the traveling motor 2 and the torque of the internal combustion engine 3 cancel out, the torque shifting to the traveling motor 2 is completed, and the torque transmitted by the engine clutch 21 that should be released becomes near zero. At this time, the engine clutch 21 is released, whereby the switching of the power transmission path is completed.

Even in the case where the traveling mode is switched to the series HEV mode in this way, the power transmission method for a vehicle according to this embodiment can provide operational advantages similar to those in the case where the traveling mode is switched to the engine direct connection mode.

Although the embodiment of the present invention has been described above, the above embodiment merely shows a part of examples of application of the present invention, and is not meant to limit the technical scope thereof to the specific configuration of the above embodiment.

In the above-described embodiment, the case where the power generation motor 4 is used as the power source after switching arranged in the second power transmission path 25 has been described. However, as the power source after switching arranged in the second power transmission path 25, the internal combustion engine 3 may be used.

In the above-described embodiment, the case where the power transmission method for a vehicle and the control unit are achieved by the single controller 7 has been described. However, the power transmission method for a vehicle and the control unit may be achieved by, for example, a combination of a plurality of controllers.

The invention claimed is:

1. A power transmission method for a vehicle, wherein the vehicle includes:
   an electric generator configured to be driven by a power of an internal combustion engine;
   a traveling motor configured to drive a driving wheel by an electric power generated by the electric generator;
   a first power transmission path configured to transmit a power between the traveling motor and the driving wheel;
   a first meshing clutch mechanism configured to connect or disconnect a power transmission of the first power transmission path;
   a second power transmission path configured to mechanically transmit the power of the internal combustion engine to the driving wheel; and
   a second meshing clutch mechanism configured to connect or disconnect a power transmission of the second power transmission path,
   the driving wheel is driven by the power of the internal combustion engine or a power of the traveling motor,
   the traveling motor arranged in the first power transmission path, and the internal combustion engine and the electric generator arranged in the second power transmission path constitute power sources, and
   the power transmission method comprises, on the basis of a torque variation of a drive shaft after an engagement timing of a meshing clutch mechanism after a switching and before a release timing of a meshing clutch mechanism before the switching when a power transmission path is switched from one of the first power transmission path and the second power transmission path to the other, the meshing clutch mechanism after the switching being a meshing clutch mechanism arranged in a power transmission path after the switching between the first meshing clutch mechanism and the second meshing clutch mechanism and the meshing clutch mechanism before the switching being a meshing clutch mechanism arranged in a power transmission path before the switching, performing at least one of:

increasing a slope of a torque increase of a power source after the switching in an absolute value with respect to a slope of a torque decrease of a power source before the switching in at least a part of a period when the drive shaft vibrates in association with an engagement of the meshing clutch mechanism after the switching while a torque transmitted by the drive shaft is smaller than a torque at a start of the switching of the power transmission path, the power source after the switching being a power source arranged in the power transmission path after the switching among the power sources and the power source before the switching being a power source arranged in the power transmission path before the switching; and increasing a slope of a torque decrease of the power source before the switching in the absolute value with respect to a slope of a torque increase of the power source after switching in at least a part of a period when the drive shaft vibrates in association with the engagement of the meshing clutch mechanism after the switching while the torque transmitted by the drive shaft is larger than the torque at the start of the switching of the power transmission path.

2. The power transmission method for the vehicle according to claim 1, wherein in at least the part of the period when the drive shaft vibrates in association with the engagement of the meshing clutch mechanism after the switching while the torque transmitted by the drive shaft is smaller than the torque at the start of the switching of the power transmission path and decreases, the slope of the torque increase of the power source after the switching is increased in the absolute value with respect to the slope of the torque decrease of the power source before the switching.

3. The power transmission method for the vehicle according to claim 1, wherein in at least the part of the period when the drive shaft vibrates in association with the engagement of the meshing clutch mechanism after the switching while the torque transmitted by the drive shaft is larger than the torque at the start of the switching of the power transmission path and increases, the slope of the torque decrease of the power source before switching is increased in the absolute value with respect to the slope of the torque increase of the power source after the switching.

4. The power transmission method for the vehicle according to claim 1, wherein in at least the part of the period when the drive shaft vibrates in association with the engagement of the meshing clutch mechanism after the switching while the torque transmitted by the drive shaft decreases below the torque at the start of the switching of the power transmission path, a torque of the power source after the switching is not decreased.

5. The power transmission method for the vehicle according to claim 1, wherein the slope of the torque decrease of the power source before the switching is varied depending on a rotation speed difference between an input rotation speed and an output rotation speed of the meshing clutch mechanism after the switching immediately before the meshing clutch mechanism is engaged.

6. A power transmission device for the vehicle, wherein the vehicle includes:

an electric generator configured to be driven by a power of an internal combustion engine;

a traveling motor configured to drive a driving wheel by an electric power generated by the electric generator;

a first power transmission path configured to transmit a power between the traveling motor and the driving wheel;

a first meshing clutch mechanism configured to connect or disconnect a power transmission of the first power transmission path;

a second power transmission path configured to mechanically transmit the power of the internal combustion engine to the driving wheel; and a second meshing clutch mechanism configured to connect or disconnect a power transmission of the second power transmission path, the driving wheel is driven by the power of the internal combustion engine or a power of the traveling motor, the traveling motor arranged in the first power transmission path, and the internal combustion engine and the electric generator arranged in the second power transmission path constitute power sources, and the power transmission device comprises a controller configured such that, on the basis of a torque variation of a drive shaft after an engagement timing of a meshing clutch mechanism after a switching and before a release timing of a meshing clutch mechanism before the switching when a power transmission path is switched from one of the first power transmission path and the second power transmission path to the other, the meshing clutch mechanism after the switching being a meshing clutch mechanism arranged in a power transmission path after the switching between the first meshing clutch mechanism and the second meshing clutch mechanism and the meshing clutch mechanism before the switching being a meshing clutch mechanism arranged in a power transmission path before the switching, the controller performs at least one of:

increasing a slope of a torque increase of a power source after the switching in an absolute value with respect to a slope of a torque decrease of a power source before the switching in at least a part of a period when the drive shaft vibrates in association with an engagement of the meshing clutch mechanism after the switching while a torque transmitted by the drive shaft is smaller than a torque at a start of the switching of the power transmission path, the power source after the switching being a power source arranged in the power transmission path after the switching among the power sources and the power source before the switching being a power source arranged in the power transmission path before the switching; and increasing a slope of a torque decrease of the power source before the switching in the absolute value with respect to a slope of a torque increase of the power source after switching in at least a part of a period when the drive shaft vibrates in association with the engagement of the meshing clutch mechanism after the switching while the torque transmitted by the drive shaft is larger than the torque at the start of the switching of the power transmission path.

* * * * *